US010663295B2

(12) United States Patent
Imaki et al.

(10) Patent No.: US 10,663,295 B2
(45) Date of Patent: May 26, 2020

(54) DISTANCE MEASUREMENT SYSTEM, MOBILE OBJECT, AND COMPONENT

(71) Applicant: SOCIONEXT INC., Yokohama, Kanagawa (JP)

(72) Inventors: Shunsaku Imaki, Yokohama (JP); Yukiteru Murao, Yokohama (JP); Tetsuro Noguchi, Yokohama (JP); Kenichi Ishida, Yokohama (JP); Masato Suzuki, Yokohama (JP); Kazuyuki Ohhashi, Yokohama (JP)

(73) Assignee: SOCIONEXT INC., Kanagawa (JP)

(*) Notice: Subject to any disclaimer, the term of this patent is extended or adjusted under 35 U.S.C. 154(b) by 136 days.

(21) Appl. No.: 15/994,117

(22) Filed: May 31, 2018

(65) Prior Publication Data

US 2018/0274917 A1  Sep. 27, 2018

Related U.S. Application Data

(63) Continuation of application No. PCT/JP2016/057357, filed on Mar. 9, 2016.

(30) Foreign Application Priority Data

Dec. 4, 2015  (JP) .................................. 2015-237172

(51) Int. Cl.
*G01C 3/08* (2006.01)
*G01C 3/06* (2006.01)
(Continued)

(52) U.S. Cl.
CPC ............... *G01C 3/085* (2013.01); *G01C 3/06* (2013.01); *G01C 11/06* (2013.01); *G06T 7/55* (2017.01);
(Continued)

(58) Field of Classification Search
CPC .......... G01C 11/06; G01C 3/06; G01C 3/085; G06T 2207/30252; G06T 7/55;
(Continued)

(56) References Cited

U.S. PATENT DOCUMENTS 5,304,980 A * 4/1994 Maekawa ................. B60R 1/00
340/435
5,535,144 A * 7/1996 Kise .................... B60K 31/0008
702/158

(Continued)

FOREIGN PATENT DOCUMENTS

JP   H06-295333 A   10/1994
JP   H10-009853 A   1/1998
(Continued)

OTHER PUBLICATIONS

Shinichi Goto et al., "3D Environment Measurement Using Binocular Stereo and Motion Stereo by Omnidirectional Stereo Image", Proceedings of Summer Seminor of the Japan Society for Precision Engineering Technical Commitee on Industrial Application of Image Processing, vol. 19, Aug. 30 to 31, 2010, pp. 80-83, translation is attached.

(Continued)

*Primary Examiner* — Peter D Le
(74) *Attorney, Agent, or Firm* — McDermott Will & Emery LLP

(57) ABSTRACT

A distance measurement system includes a pair of cameras and is arranged on a roof of a mobile object or an upper edge portion of a door of the mobile object. One of the cameras is arranged at a first portion on an upper surface of the roof or on the upper edge portion of the door, includes an optical axis oriented upward from the upper surface, and has a field of view in all directions around the optical axis. The other camera is arranged at a second portion different from the first portion on the upper surface of the roof or the upper edge (Continued)

portion of the door, includes an optical axis oriented upward from the upper surface, and has a field of view in all directions around the optical axis. Distance measurement in all directions from the mobile object is performed by using this pair of cameras.

16 Claims, 37 Drawing Sheets

(51) Int. Cl.
*H04N 13/207* (2018.01)
*G01C 11/06* (2006.01)
*G06T 7/55* (2017.01)
*H04N 5/225* (2006.01)
*H04N 5/247* (2006.01)
*H04N 13/00* (2018.01)

(52) U.S. Cl.
CPC ........... *H04N 5/2253* (2013.01); *H04N 5/247* (2013.01); *H04N 13/207* (2018.05); *G06T 2207/30252* (2013.01); *H04N 2013/0081* (2013.01)

(58) Field of Classification Search
CPC ......... H04N 13/207; H04N 2013/0081; H04N 5/2253; H04N 5/247
See application file for complete search history.

(56) References Cited

U.S. PATENT DOCUMENTS

| | | | | |
|---|---|---|---|---|
| 5,937,079 | A * | 8/1999 | Franke | G06K 9/209 382/103 |
| 6,118,475 | A * | 9/2000 | Iijima | G01C 11/06 348/42 |
| 6,122,597 | A * | 9/2000 | Saneyoshi | G06T 7/11 701/301 |
| 6,370,261 | B1 * | 4/2002 | Hanawa | G01S 13/931 382/104 |
| 6,477,260 | B1 * | 11/2002 | Shimomura | H04N 13/239 382/106 |
| 6,812,831 | B2 * | 11/2004 | Ikeda | B60K 35/00 340/435 |
| 7,161,616 | B1 * | 1/2007 | Okamoto | B60R 1/00 348/148 |
| 8,269,820 | B2 * | 9/2012 | Koyanagi | H04N 13/239 348/47 |
| 8,284,239 | B2 * | 10/2012 | Chiu | B60R 1/12 348/47 |
| 2003/0202097 | A1 * | 10/2003 | Kallhammer | B60R 1/00 348/148 |
| 2004/0075544 | A1 * | 4/2004 | Janssen | G08G 1/166 340/435 |
| 2004/0119881 | A1 * | 6/2004 | Matko | B60R 11/04 348/375 |
| 2005/0057651 | A1 * | 3/2005 | Imoto | B60R 1/00 348/148 |
| 2005/0240342 | A1 * | 10/2005 | Ishihara | B60R 1/00 701/1 |
| 2006/0069478 | A1 * | 3/2006 | Iwama | G08G 1/168 701/36 |
| 2008/0055407 | A1 * | 3/2008 | Abe | G01C 21/26 348/118 |
| 2008/0122604 | A1 * | 5/2008 | Hattori | B62D 15/0275 340/441 |
| 2009/0160940 | A1 * | 6/2009 | Imamura | B60R 1/00 348/159 |
| 2010/0245577 | A1 * | 9/2010 | Yamamoto | B60R 1/00 348/148 |
| 2011/0063436 | A1 * | 3/2011 | Mizutani | G01S 11/12 348/135 |
| 2011/0106380 | A1 * | 5/2011 | Wang | B60R 1/00 701/36 |
| 2011/0285812 | A1 * | 11/2011 | Hinkel | G06T 3/0062 348/38 |
| 2012/0093365 | A1 * | 4/2012 | Aragane | H04N 7/15 382/103 |
| 2012/0262580 | A1 * | 10/2012 | Huebner | B60R 1/00 348/148 |
| 2012/0323525 | A1 * | 12/2012 | Lee | G01C 17/00 702/152 |
| 2014/0085409 | A1 * | 3/2014 | Zhang | H04N 5/23238 348/36 |
| 2014/0132527 | A1 * | 5/2014 | Wu | G06F 3/04883 345/173 |
| 2014/0168440 | A1 * | 6/2014 | Tsuchiya | B60R 1/00 348/148 |
| 2015/0062292 | A1 * | 3/2015 | Kweon | H04N 5/23238 348/37 |
| 2015/0071490 | A1 * | 3/2015 | Fukata | G06K 9/00791 382/103 |
| 2015/0124060 | A1 * | 5/2015 | Hasegawa | H04N 13/243 348/47 |
| 2015/0161457 | A1 * | 6/2015 | Hayakawa | G08G 1/166 348/46 |
| 2015/0210274 | A1 * | 7/2015 | Clarke | B60K 31/00 382/104 |
| 2016/0006932 | A1 * | 1/2016 | Zhang | B60R 1/00 348/222.1 |
| 2016/0073020 | A1 * | 3/2016 | Matsumoto | G06T 3/0018 348/222.1 |
| 2016/0205384 | A1 * | 7/2016 | Sekiguchi | G06K 9/00791 348/50 |
| 2016/0300113 | A1 * | 10/2016 | Molin | G06T 7/80 |
| 2017/0028917 | A1 * | 2/2017 | Tauchi | B60R 1/00 |
| 2017/0297491 | A1 * | 10/2017 | Tanaka | B60R 1/00 |
| 2017/0341583 | A1 * | 11/2017 | Zhang | G06T 7/73 |
| 2018/0009394 | A1 * | 1/2018 | Okabe | B60R 1/00 |

FOREIGN PATENT DOCUMENTS

| | | |
|---|---|---|
| JP | 2000-074669 A | 3/2000 |
| JP | 2001-141422 A | 5/2001 |
| JP | 2004-034373 A | 2/2004 |
| JP | 2006-250917 A | 9/2006 |
| JP | 2008-096162 A | 4/2008 |
| JP | 2008-167244 A | 7/2008 |
| JP | 2010-276433 A | 12/2010 |
| JP | 2011-064566 A | 3/2011 |
| JP | 2013-024662 A | 2/2013 |
| JP | 2015-126276 A | 7/2015 |
| WO | 2008/053649 A1 | 5/2008 |
| WO | 2013/165006 A1 | 11/2013 |

OTHER PUBLICATIONS

Shinichi Goto et al., "3D Environment Measurement Using Binocular Stereo and Motion Stereo by Mobile Robot with Omnidirectional Stereo Camera", Proceedings of 2011 IEEE International Conference on Computer Vision Workshops (The workshop on Omnidirectional Vision, Camera, Networks and Non-classical Cameras (OMNIVIS2011)), Nov. 7, 2011, pp. 296-303.
Research Subject of Yamashita Laboratory, Web Page, URL:http:// www.robot.t.u-tokyo.ac.jp/yamalab/research-j.html, Updated on: Jan. 1, 2015, "Environment Recognition Using Mobile Robot with Omnidirectional Camera (Apr. 2004 to Today)" partial translation is attached.
International Search Report dated May 17, 2016 for PCT/JP2016/ 057357.
Written Opinion of the International Searching Authority dated May 17, 2016 for PCT/JP2016/057357 with partial translation.
Office Action issued in corresponding Japanese Patent Application No. 2015-237172, dated Jul. 9, 2019, with English translation.

(56) References Cited

OTHER PUBLICATIONS

Office Action issued in corresponding Japanese Patent Application No. 2015-237172, dated Sep. 17, 2019, with English translation.

* cited by examiner

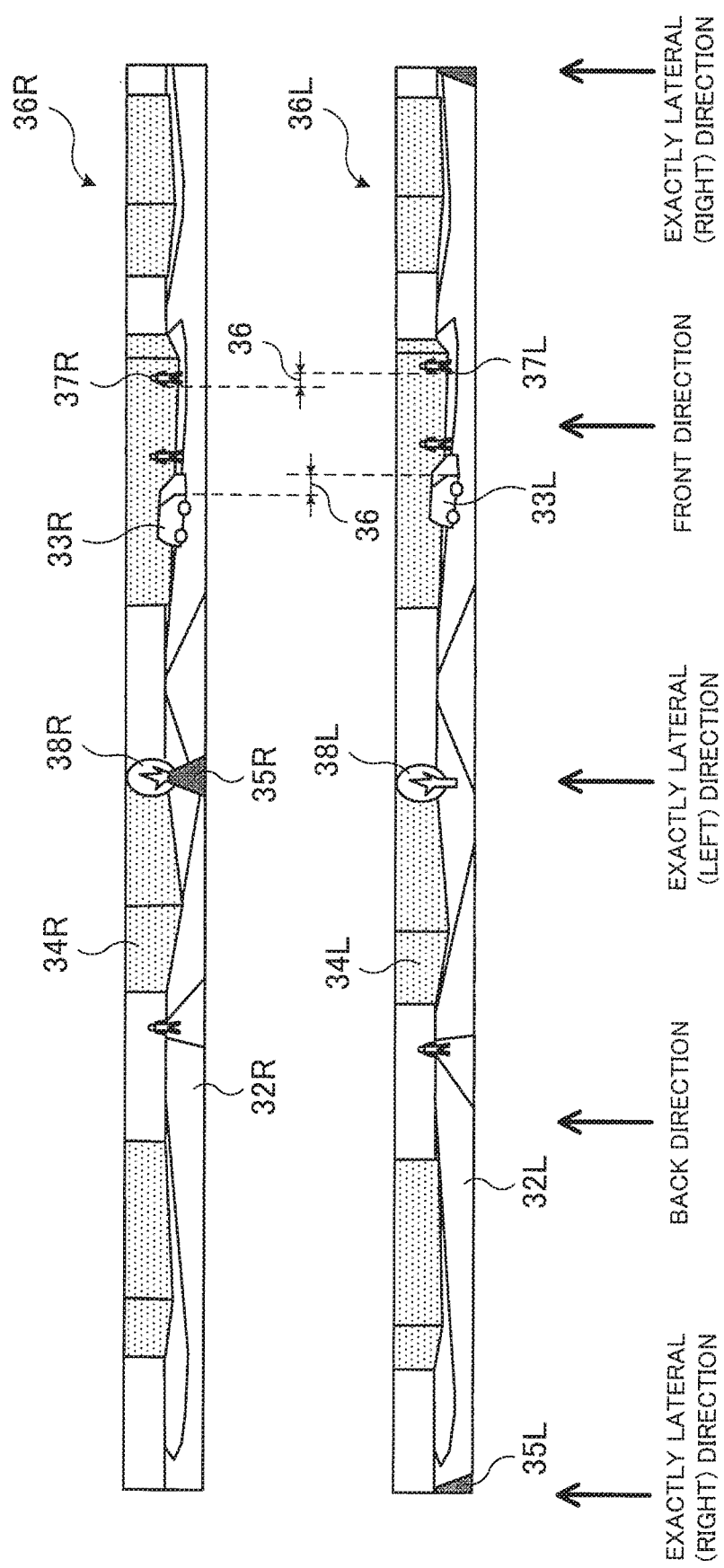

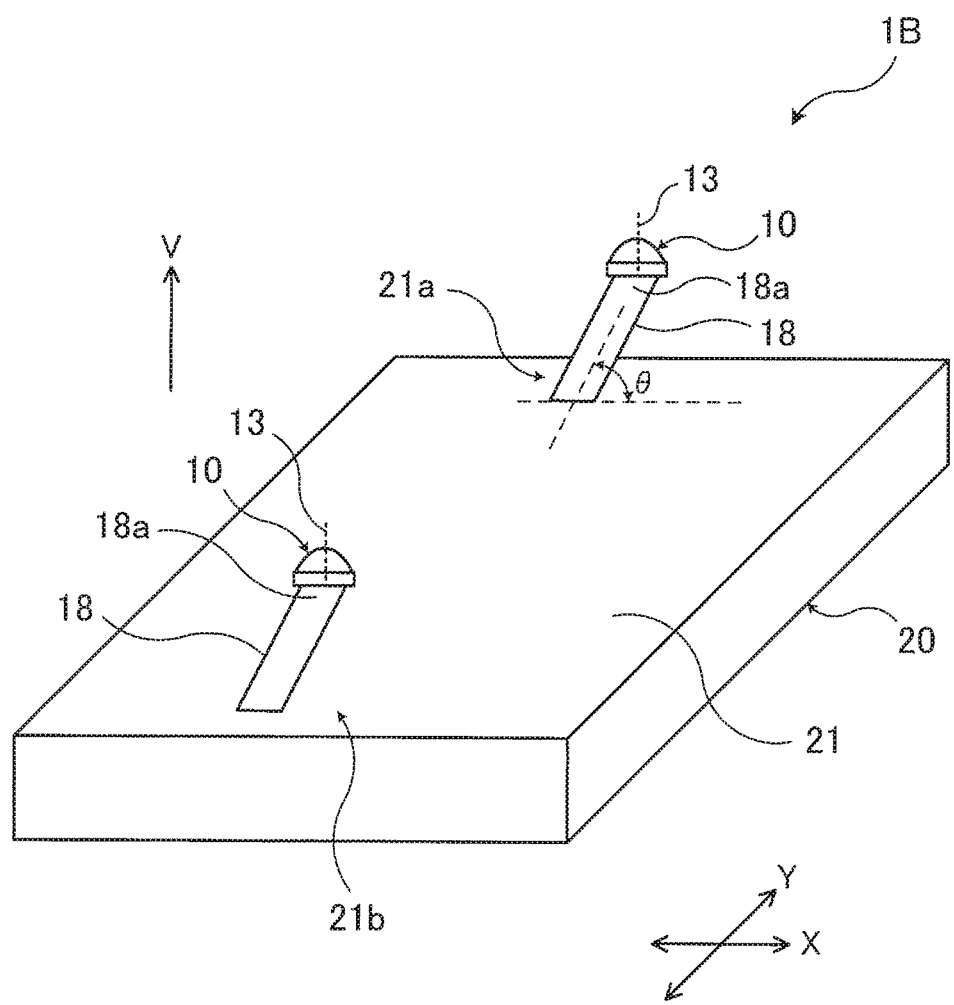

DISTANCE MEASUREMENT SYSTEM, MOBILE OBJECT, AND COMPONENT

CROSS-REFERENCE TO RELATED APPLICATION

This application is a continuation application of International Application PCT/JP2016/057357 filed on Mar. 9, 2016 and designated the U.S., which is based upon and claims the benefit of priority of the prior Japanese Patent Application No. 2015-237172, filed on Dec. 4, 2015, the entire contents of which are incorporated herein by reference.

FIELD

The embodiments discussed herein relate to a distance measurement system, a mobile object, and component.

BACKGROUND

There is known a distance measurement technique of calculating the depth value of a certain area of an object. In this technique, parallax images of the object from two different viewpoints are captured, and the depth value of the certain area of the object is calculated based on the captured parallax images. There is also known a technique of capturing images of an object from two viewpoints by using cameras including optical lenses whose view angle (angle of view) is wide, such as fisheye lenses. See, for example, the following documents:

Japanese Laid-open Patent Publication No. 2001-141422
International Publication Pamphlet No. WO2013/165006

When the above distance measurement techniques are applied to a mobile object such as a vehicle and all directions, from the front, back, right, and left of the mobile object, are set as the distance measurement directions, a pair of cameras needs to be arranged, for example, on each of the longitudinal and transverse sides of the mobile object. Namely, the number of cameras that need to be arranged on the mobile object is increased.

SUMMARY

According to one aspect, there is provided a distance measurement system including: a first camera which is arranged at a first portion that is located on an upper surface of a roof of a mobile object on which the distance measurement system is arranged, located on an upper surface of an upper edge portion of a door of the mobile object, or located on an upper surface of a component arranged on the roof or the upper edge portion, which is located above the upper surface, which includes a first optical axis oriented upward from the upper surface, and which has a field of view in all directions around the first optical axis; and a second camera which is arranged at a second portion different from the first portion located on the upper surface, which is located above the upper surface, which includes a second optical axis oriented upward from the upper surface, and which has a field of view in all directions around the second optical axis.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates normal images obtained from the examples of images acquired by the distance measurement system according to the first embodiment;

FIG. 5 illustrates an example of a result obtained from the distance measurement performed by the distance measurement system according to the first embodiment;

FIG. 17 illustrates an example of a distance measurement system according to a fifth embodiment;

DESCRIPTION OF EMBODIMENTS

Figure 1:
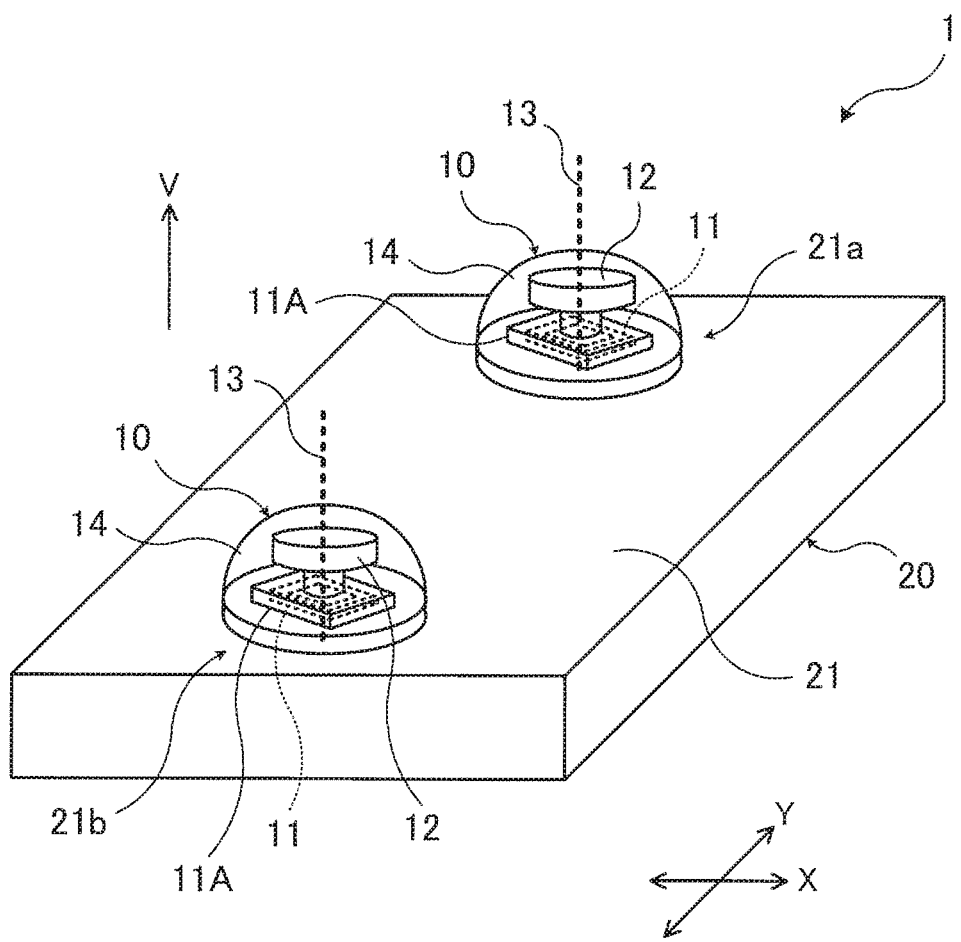
FIG. 1 illustrates an example of a distance measurement system according to a first embodiment.

Several embodiments will be described below with reference to the accompanying drawings, wherein like reference characters refer to like elements throughout. First, a first embodiment will be described.

FIG. 1 illustrates an example of a distance measurement system according to the first embodiment. More specifically, FIG. 1 is a schematic perspective view of a main portion of an example of a distance measurement system according to the first embodiment.

This distance measurement system 1 illustrated in FIG. 1 includes a pair of cameras 10, which are arranged at different portions 21a and 21b of an upper surface 21 of a mobile object 20. For example, as illustrated in FIG. 1, the pair of cameras 10 is arranged on an upper surface of the roof of a vehicle or an upper surface of a component attached to the roof of a vehicle. In FIG. 1, an upper direction V may be a direction vertically upward from the upper surface 21 or from another object other than the upper surface 21.

The upper surface 21 of the mobile object 20 illustrated in FIG. 1 is the entire upper surface of the mobile object 20 or a part of the upper surface thereof. In addition, for example, the same kind of camera is used as the pair of cameras 10.

Each of the cameras 10 includes an image sensor 11 and a lens 12. The image sensor 11 is held in a case 11A made of plastic or the like and converts incident light traveling through the lens 12 into electrical signals. For example, a charge-coupled device (CCD) image sensor or a complementary metal-oxide-semiconductor (CMOS) image sensor is used as the image sensor 11. An optical lens having a wide view angle of 180 degrees (°) or more, such as a fisheye lens, is used as the lens 12. Each of the cameras 10 including the image sensor 11 and the lens 12 is arranged on the upper surface 21 of the mobile object 20 in such a manner that an optical axis 13 is oriented in the upper direction V. The camera 10 has a field of view in all directions around the optical axis 13. Namely, the camera 10 is a 360-degree camera.

Each of the cameras 10 may further include a cover 14 covering the image sensor 11 and the lens 12 as illustrated in FIG. 1. It is desirable that the cover 14 be highly transparent. For example, acrylic material may be used for the cover 14. In FIG. 1, as an example, each of the covers 14 has a domical shape.

The pair of cameras 10 may be a combination of different kinds of camera, such as an infrared camera and a visible light camera.

The mobile object 20 including the distance measurement system 1 may move forward in an X or Y direction illustrated in FIG. 1. Namely, the pair of cameras 10 in the distance measurement system 1 may be arranged on front and back sides of the mobile object 20 in the forward direction of the mobile object 20 (when the mobile object 20 moves in the Y direction) or on the right and left sides of the mobile object 20 with respect to the forward direction of the mobile object 20 (when the mobile object 20 moves in the X direction).

For example, a computer controlled by at least one processor realizes various processing relating to the distance measurement in the distance measurement system 1. Examples of the processing include acquisition of images via the pair of cameras 10 in the distance measurement system 1, acquisition of parallax images from the acquired images, and acquisition of distances based on the parallax images. In this case, the computer that performs various processing relating to the distance measurement may be included in the distance measurement system 1 or may be connected to the distance measurement system 1 via wired or wireless communication means.

As described above, in the distance measurement system 1, the pair of cameras 10 having a field of view in all directions around the optical axis 13 oriented in the upper direction V, namely, a pair of 360-degree cameras, is arranged on the upper surface 21 of the mobile object 20. This pair of cameras 10 acquires images around the mobile object 20 (in all directions from front to back and right to left). The distance to a certain object that exists around the mobile object 20 is calculated from the 360-degree images of the mobile object 20 acquired by the pair of cameras 10. Thus, even when all directions from the mobile object 20 are set as the distance measurement directions, a pair of cameras does not need to be arranged on each of the longitudinal and transverse sides of the mobile object 20, the cameras having their optical axes oriented in their respective directions of the forward, backward, right, and left directions.

In the above distance measurement system 1, with a smaller number of cameras (two cameras 10 in this example), all directions from the mobile object 20 are set as the distance measurement directions, and the distance to a certain object that exists around the mobile object 20 is calculated. It is possible to realize the distance measurement system 1 in which all directions from the mobile object 20 are set as the distance measurement directions while needing a smaller number of components and lower costs and energy for manufacturing, installation, and operation.

Figure 2A:
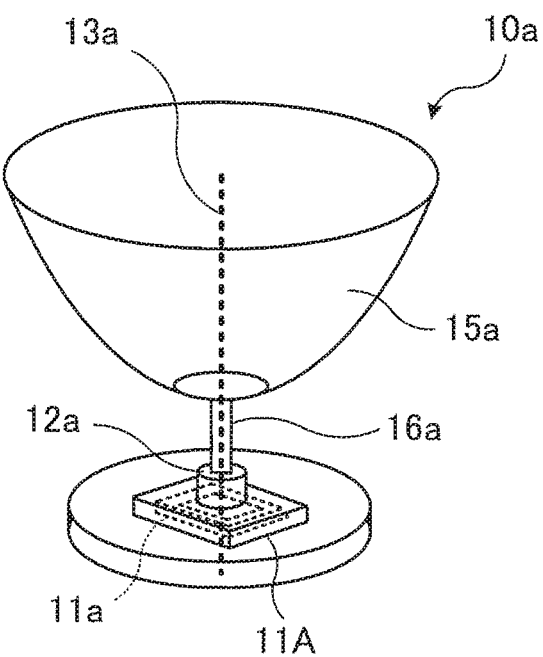
FIGS. 2A and 2B illustrate other examples of cameras according to the first embodiment.
Figure 2B:
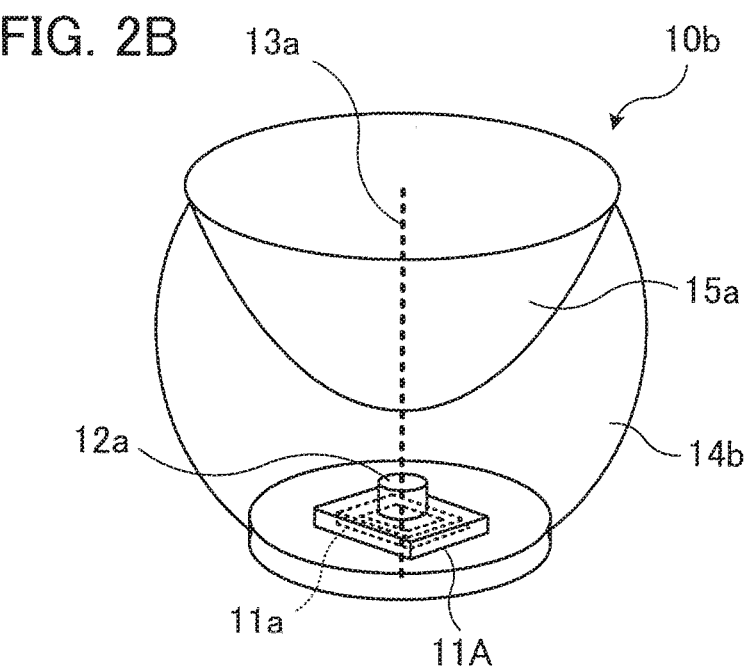

While FIG. 1 illustrates, as an example, the distance measurement system 1 using the cameras 10 including the wide-view-angle lenses 12 such as fisheye lenses, the distance measurement system 1 may use cameras as illustrated in FIGS. 2A and 2B.

FIGS. 2A and 2B illustrate other examples of the cameras according to the first embodiment. More specifically, FIG.

2A is a schematic perspective view of a main portion of a first example of a camera according to the first embodiment. FIG. 2B is a schematic perspective view of a main portion of a second example of a camera according to the first embodiment.

This camera 10a illustrated in FIG. 2A includes an image sensor 11a, a lens 12a, and a mirror 15a. The image sensor 11a is held in a case 11A, for example. For example, a CCD image sensor or a CMOS image sensor is used as the image sensor 11a. A general lens, which is not a wide-view-angle lens such as a fisheye lens, is used as the lens 12a. The mirror 15a having a paraboloidal, hemispherical, or conical shape is disposed to face the image sensor 11a and the lens 12a. The mirror 15a has a convex side facing the lens 12 and is supported by supporting rod 16a.

For example, a pair of cameras 10a as illustrated in FIG. 2A may be used in place of the pair of cameras 10 according to the distance measurement system 1 illustrated in FIG. 1. In this case, each of the cameras 10a is arranged on the upper surface 21 of the mobile object 20 in such a manner that an optical axis 13a is oriented in the upper direction V illustrated in FIG. 1. In the case of the camera 10a illustrated in FIG. 2A, the light, which has been incident on the image sensor 11a via the lens 12a after incident on and reflected by the paraboloidal, hemispherical, or conical mirror 15a, is converted into electrical signals, and images around (in all directions from) the camera 10a are acquired. As with the cameras 10, the camera 10a has a field of view in all directions around the optical axis 13a. Namely, the camera 10a is a 360-degree camera.

With the distance measurement system using a pair of cameras 10a as illustrated in FIG. 2A, the distance to a certain object that exists around the mobile object 20 is also calculated from the 360-degree images of the mobile object 20 acquired by the pair of cameras 10a. In addition, it is possible to realize the distance measurement system in which all directions from the mobile object 20 are set as the distance measurement directions while needing a smaller number of components and lower costs and energy for manufacturing, installation, and operation.

A camera 10b illustrated in FIG. 2B includes a domical cover 14b that covers the space formed by an image sensor 11a, a lens 12a, and a mirror 15a. It is desirable that the cover 14h be highly transparent. While the camera 10b may be configured to include the same supporting rod 16a as used in the camera 10a illustrated in FIG. 2A, the camera 10b may be configured without a supporting rod as illustrated in FIG. 2B.

For example, a pair of cameras 10b as illustrated in FIG. 2B may be used in place of the pair of cameras 10 according to the distance measurement system 1 illustrated in FIG. 1. In this case, each of the cameras 10b is arranged on the upper surface 21 of the mobile object 20 in such a manner that an optical axis 13a is oriented in the upper direction V illustrated in FIG. 1. The camera 10b illustrated in FIG. 2B is also a 360-degree camera. In addition, the light, which has been incident on the image sensor 11a via the lens 12a after incident on the mirror 15a via the cover 14b and reflected by the mirror 15a, is converted into electrical signals, and images around (in all directions from) the camera 10b are acquired.

In the case of the camera 10b illustrated in FIG. 2B, since at least an outer edge portion of the mirror 15a is supported by the cover 14b, displacement of the mirror 15a is prevented, and as a result, displacement of the optical axis 13a in the image sensor 11a, the lens 12a, and the mirror 15a is prevented.

With the distance measurement system using a pair of cameras 10b as illustrated in FIG. 2B, the distance to a certain object that exists around the mobile object 20 is also calculated from the 360-degree images of the mobile object 20 acquired by the pair of cameras 10b. In addition, it is possible to realize the distance measurement system in which all directions from the mobile object 20 are set as the distance measurement directions while needing a smaller number of components and lower costs and energy for manufacturing, installation, and operation.

Since the camera 10a in FIG. 2A acquires images from the light directly incident on the mirror 15a, the camera 10a acquires images of better quality, compared with the camera 10b in FIG. 2B, which acquires images from the light incident on the mirror 15a via the cover 14b.

Figure 3A:
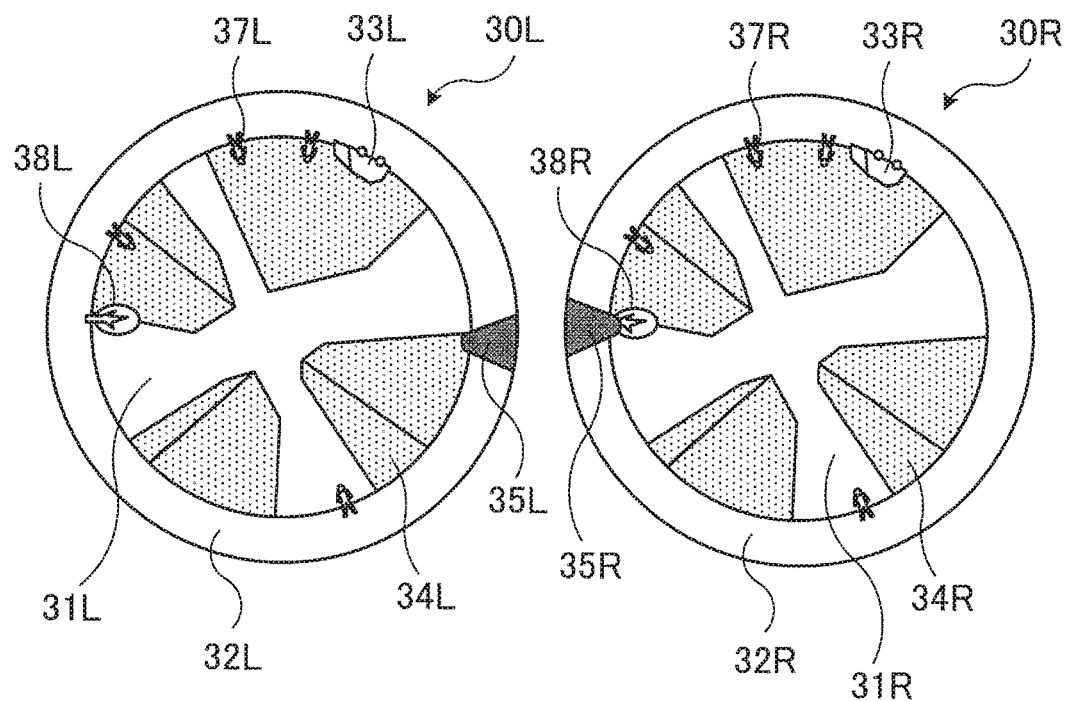
FIGS. 3A and 3B illustrate examples of images acquired by the distance measurement system according to the first embodiment.
Figure 3B:
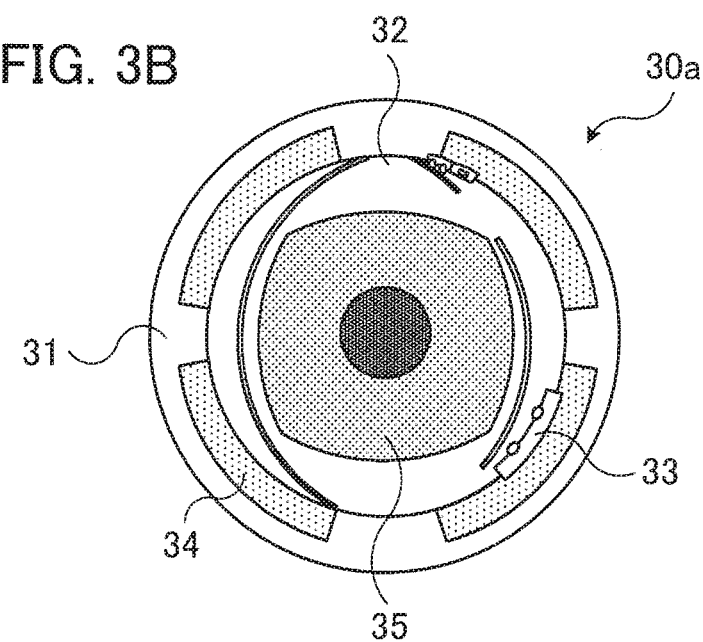

FIGS. 3A and 3B illustrate examples of images acquired by the distance measurement system according to the first embodiment. More specifically, FIG. 3A illustrates examples of images acquired by the cameras 10 illustrated in FIG. 1. FIG. 3B illustrates an example of images acquired by the cameras 10a illustrated in FIG. 2A.

For example, when the cameras 10 as illustrated in FIG. 1, each of which includes the lens 12 having a wide view angle and the optical axis 13 oriented in the upper direction V, capture outdoor images, the cameras 10 acquire a first image 30L and a second image 30R as illustrated in FIG. 3A through the left and right lenses 12, respectively. The acquired first and second images 30L and 30R include sky images 31L and 31R in the center portions and include ground-level images 32L and 32R at the peripheral portions around the center portions, respectively. In addition, the first and second images 30L and 30R include vehicles 33L and 33R, buildings 34L and 34R, pedestrians 37L and 37R, trees 38L and 38R, and parts 35L and 35R of the mobile object 20 captured by the lenses 12, respectively. The parts 35L and 35R of the mobile object 20 may be a part of a housing on which the lenses 12 are installed. Depending on the installation positions or surrounding environments of the lenses 12, the sky images 31L and 31R, the ground-level images 32L and 32R, the vehicles 33L and 33R, the buildings 34L and 34R, the pedestrians 37L and 37R, the trees 38L and 38R, or the parts 35L and 35R of the mobile object 20 need not be included in the first and second images 30L and 30R. In the first and second images 30L and 30R acquired by the cameras 10, the captured sky images 31L and 31R are relatively large. While FIG. 3A illustrates a case in which the first and second images 30L and 30R have been captured when the cameras 10 are arranged on the left and right sides of the mobile object 20 with respect to a forward direction of the mobile object 20, the installation positions of the cameras 10 are not limited to these sides, as will be described below. The first and second images 30L and 30R are acquired based on the installation positions of the cameras 10.

FIG. 3D illustrates an image 30a acquired by the camera 10a in FIG. 2A. The image 30a includes a sky image 31, a ground-level image 32, a vehicle 33, a building 34, and a part 35 of the mobile object 20. The vehicle 33 may be a pedestrian, a tree, or the like. In addition, the part 35 of the mobile object 20 may be a part of the housing on which the camera 10a is installed. While FIG. 3B illustrates only one image 30a, for example, when two cameras 10a are used, first and second images are acquired, as in FIG. 3A.

FIG. 4 illustrates normal images obtained from the first and second images 30L and 30R illustrated in FIG. 3A, and these normal images are used for distance measurement. More specifically, FIG. 4 illustrates a first image 36L, which is a normal image obtained from the first image 30L, and a second image 36R, which is obtained from the second image 30R. By using two cameras 10a and capturing two images 30a as illustrated in FIG. 3B as first and second images as described above, a plurality of normal images as illustrated in FIG. 4 are also obtained from the first and second images.

Figure 5A:
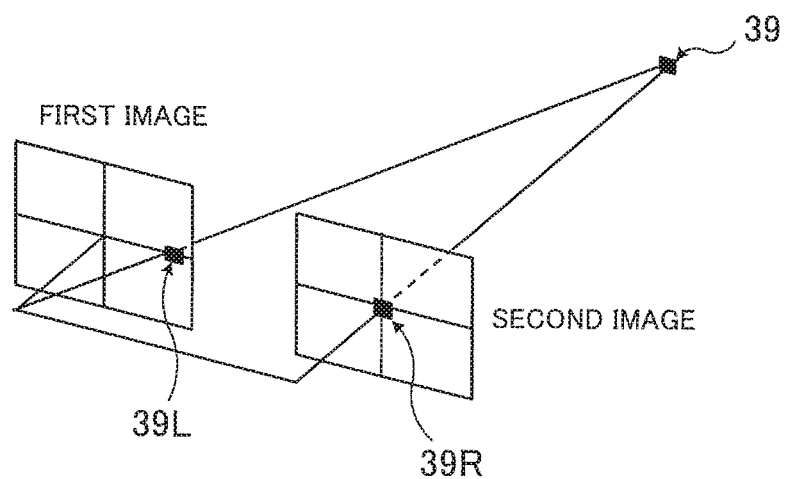
FIGS. 5A and 5B illustrate distance measurement principles.
Figure 5B:
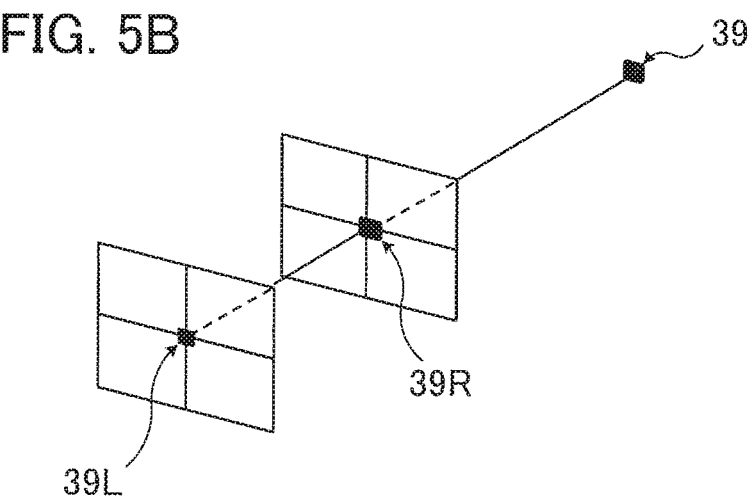

FIGS. 5A and 5B illustrate distance measurement principles. A distance measurement target 39 is a target captured by the image sensors 11 of the cameras 10 and is, for example, any one of the vehicles 33L and 33R, the buildings 34R and 34L, the pedestrians 37L and 37R, the trees 38L and 38R, and the ground-level images 32R and 32L in FIG. 4. Other examples of the distance measurement target 39 include an animal and a traffic structure. Based on the parallax (parallax 36 in FIG. 4) between the position of a captured image 39L included in the first image and the position of a captured image 39R included in the second image, the distance to the distance measurement target 39 in the front direction or the back direction in FIG. 4 is measured, for example, by using the difference between the horizontal coordinates of the positions (FIG. 5A). In contrast, the distance to a distance measurement target 39 in an exactly lateral direction in FIG. 4 is measured by using the difference between the size of a captured image 39L of the distance measurement target 39 included in the first image and the size of a captured image 39R of the distance measurement target 39 included in the second image (FIG. 5B). The distance to a distance measurement target 39 located in a direction between an exactly lateral direction and the back direction or between an exactly lateral direction and the front direction may be measured by using both of the principles illustrated in FIGS. 5A and 5B. In addition, from these calculated distances, various kinds of information based on the distances may be generated and outputted. Examples of the information include information about an image indicating the distance to an object that exists within the field of view and information about an alarm that is turned on when the distance to an object indicates a certain value or less.

Since an individual camera 10 is superior to the camera 10a using the mirror 15a and the like in the adjustment of the optical axis 13, the optical axis 13 is more stable. Thus, the pair of cameras 10 is able to stably acquire the first and second images 30L and 30R with good image quality. Consequently, it is possible to perform the distance measurement by accurately calculating the parallax, measurement errors, variations, etc.

The ground-level images 32 included in the image 30a captured by using the camera 10a is relatively large. The camera 10b illustrated in FIG. 2B also acquires an image similar to the image illustrated in FIG. 3B.

The distance measurement is performed by using a plurality of images 30a captured by using a pair of cameras 10a. For example, when the distance to an object that exists at the outdoor ground level is a distance measurement target, the parallax between the ground-level images 32 in the center portions in the images 30a is calculated, and the distance is measured based on the calculated parallax. In this way, when the distance to an object that exists at the outdoor ground level is a distance measurement target, if the ground-level images 32 included in the images 30a are relatively large, more pixels are used to calculate the parallax. As a result, the image sensors 11a is effectively used.

Figure 6:
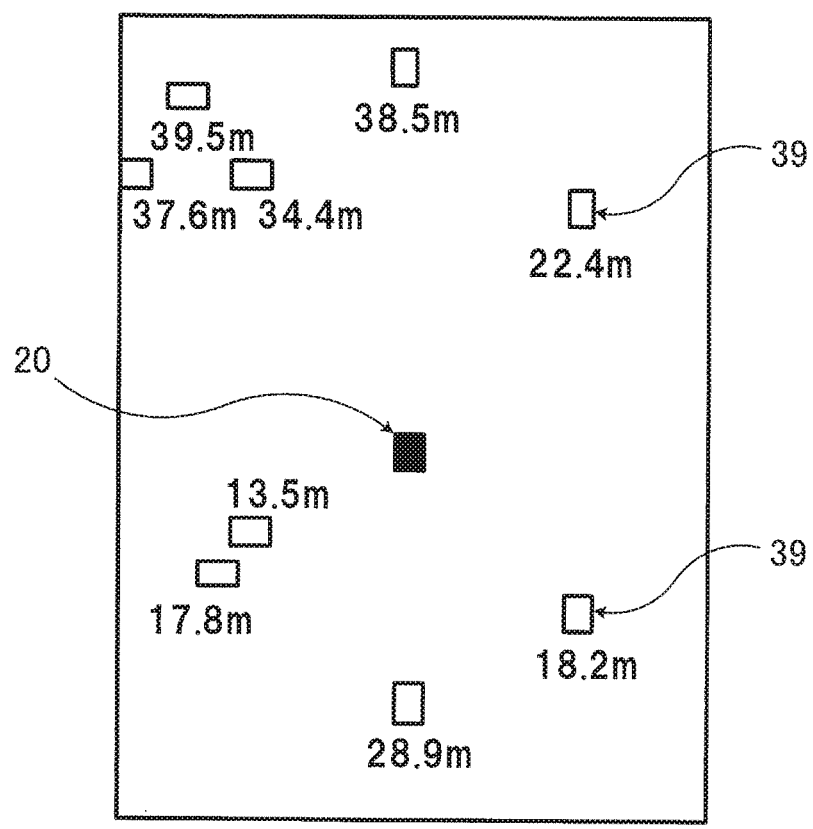

FIG. 6 illustrates an example of a result obtained from the distance measurement performed by the distance measurement system according to the first embodiment. In FIG. 6, the mobile object 20 is seen from above, and the front side of the mobile object 20 faces in the direction of the top portion in FIG. 6. According to the first embodiment, the distance from the mobile object 20 to a distance measurement target 39 that exists in any direction around the mobile object 20 is acquired.

Next, a second embodiment will be described.

In the second embodiment, a mode in which the distance measurement system is mounted on a vehicle, for example, an automobile, which is a kind of mobile object, will be described.

Figure 7A:
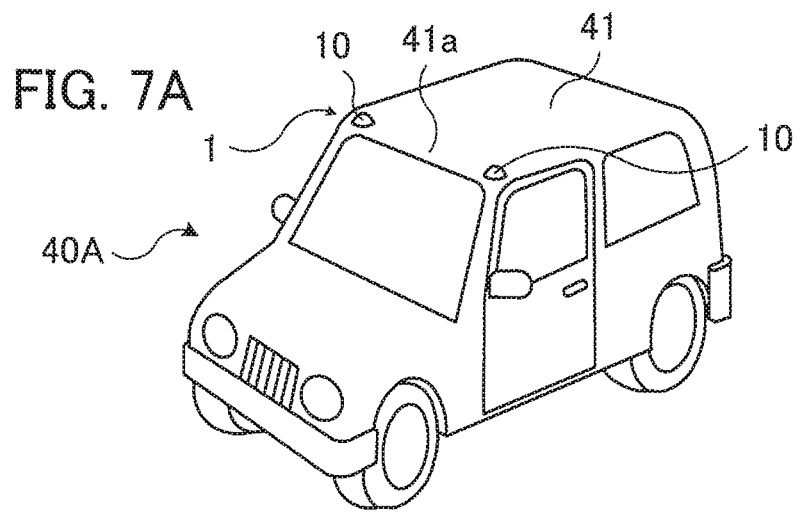
FIGS. 7A to 7C illustrate first configuration examples of a distance-measurement-system-equipped vehicle according to a second embodiment.
Figure 7B:
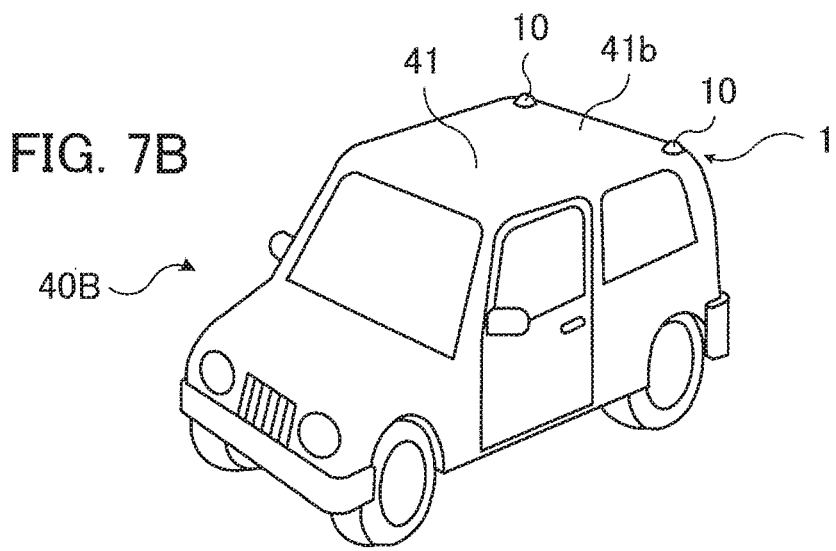
Figure 7C:
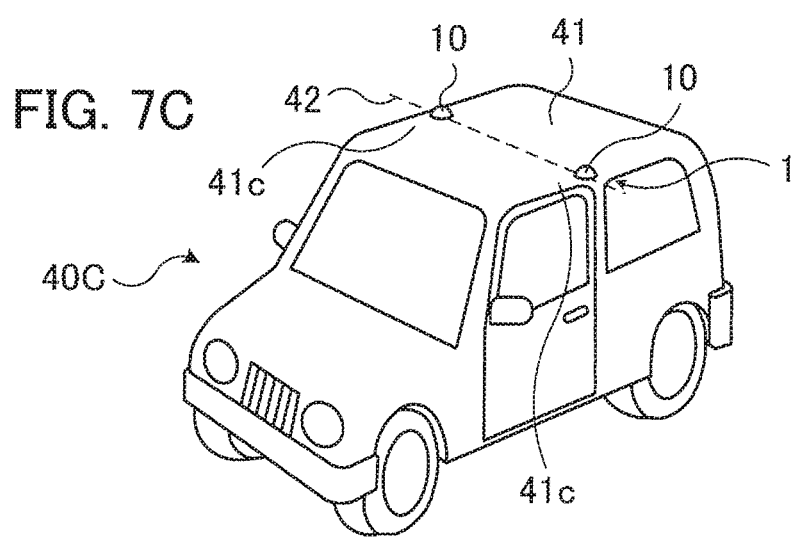

FIGS. 7A to 7C illustrate first configuration examples of a distance-measurement-system-equipped vehicle according to the second embodiment. FIG. 7A to 7C are schematic perspective views of main portions of first configuration examples of a distance-measurement-system-equipped vehicle according to the second embodiment.

A vehicle (an automobile) 40A illustrated in FIG. 7A has a roof 41 and an edge portion 41a on the front side of the roof 41 (on the front side of the automobile 40A). In addition, a pair of cameras in a distance measurement system, for example, a pair of cameras 10 in the distance measurement system 1 as described in the first embodiment, is arranged on the right and left sides on the edge portion 41a. The pair of cameras 10 is arranged at the two portions on the front-side edge portion 41a in such a manner that the optical axes 13 (FIG. 1) are oriented upward from the roof 41. This pair of cameras 10 enables all directions, from front to back and right to left of the automobile 40A, to be the distance measurement directions. By using the distance measurement system 1 including the pair of cameras 10 arranged on the front-side edge portion 41a, the distances to various objects that exist around the automobile 40A are measured. The pair of cameras 10 may be arranged on upper edge portions of the right and left doors of the automobile 40A.

A vehicle (an automobile) 40B illustrated in FIG. 7B has a roof 41 and an edge portion 41b on the rear side of the roof 41 (on the rear side of the automobile 40B). In addition, for example, a pair of cameras 10 in the distance measurement system 1 as described in the first embodiment is arranged on the right and left sides on the edge portion 41b. The pair of cameras 10 is arranged at the two portions on the rear-side edge portion 41b in such a manner that the optical axes 13 (FIG. 1) are oriented upward from the roof 41. This pair of cameras 10 enables all directions, from front to back and right to left of the automobile 40B, to be the distance measurement directions. By using the distance measurement system 1 including the pair of cameras 10 arranged on the rear-side edge portion 41b, the distances to various objects that exist around the automobile 40B are measured. If the automobile 40B has a hatchback door on its rear side, the pair of cameras 10 may be arranged on an upper surface of an upper edge portion of the hatchback door.

A vehicle (an automobile) 40C illustrated in FIG. 7C has a roof 41 and right and left edge portions 41c on a center line 42 that extends in the transverse direction of the automobile 40C. In addition, for example, a pair of cameras 10 the distance measurement system 1 as described in the first embodiment is arranged on the right and left edge portions 41c. The pair of cameras 10 is arranged at the two portions of the right and left edge portions 41c in such a manner that the optical axes 13 (FIG. 1) are oriented upward from the roof 41. This pair of cameras 10 enables all directions, from front to back and right to left of the automobile 40C, to be the distance measurement directions. By using the distance measurement system 1 including the pair of cameras 10 arranged on the right and left edge portions 41c, the distances to various objects that exist around the automobile 40C are measured. The pair cameras 10 may be arranged on upper edge portions of the right and left doors of the automobile 40C.

For example, in the case of the automobile 40A illustrated in FIG. 7A, since a pair of cameras 10 is mounted on the front side of the roof 41, a relatively large amount of information about objects that exist in the front direction of the automobile 40A (for example, larger images and distances to more objects in the front direction) and a relatively small amount of information about the roof 41 are acquired. In the case of the automobile 40B illustrated in FIG. 7B, since a pair of cameras 10 is mounted on the rear side of the roof 41, a relatively large amount of information about objects that exist in the back direction of the automobile 40B (for example, larger images and distances to more objects in the back direction) and a relatively small amount of information about the roof 41 are acquired. In the case of the automobile 40C illustrated in FIG. 7C, since a pair of cameras 10 is mounted on the right and left sides of the roof 41, a relatively large amount of information about objects that exist in the front and back directions of the automobile 40C (for example, larger images and distances to more objects in the front and back directions) and a relatively small amount of information about the roof 41 are acquired.

Figure 8A:
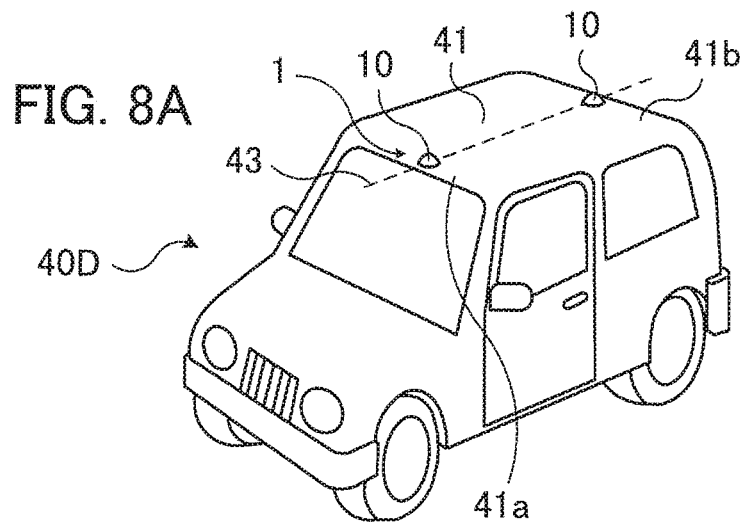
FIGS. 8A to 8C illustrate second configuration examples of the distance-measurement-system-equipped vehicle according to the second embodiment.
Figure 8B:
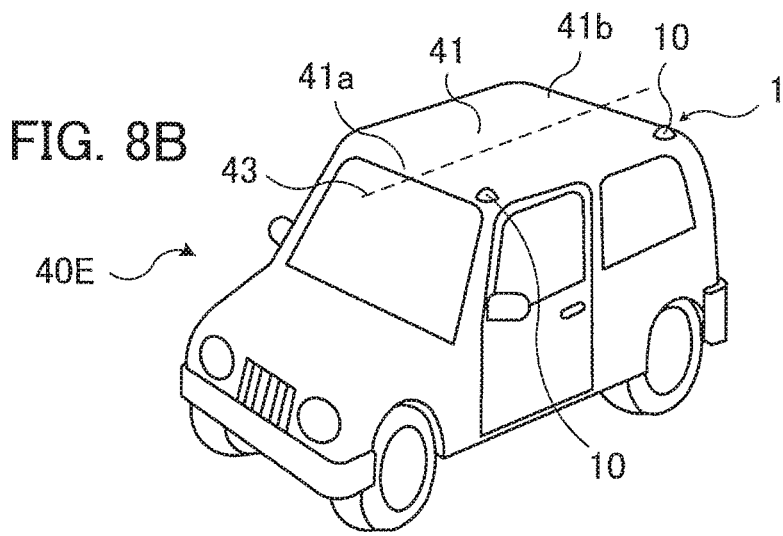
Figure 8C:
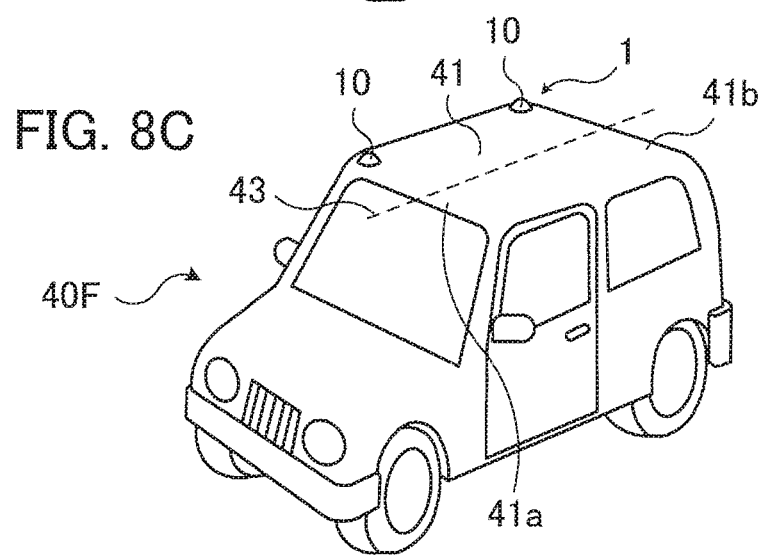

FIGS. 8A to 8C illustrate second configuration examples of the distance-measurement-system-equipped vehicle according to the second embodiment. FIGS. 8A to 8C are schematic perspective views of main portions of second configuration examples of the distance-measurement-system-equipped vehicle according to the second embodiment.

A vehicle (an automobile) 40D illustrated in FIG. 8A has a roof 41 and a front-side edge portion 41a and a rear-side edge portion 41b on a center line 43 that extends in the forward direction of the automobile 40D. In addition, for example, a pair of cameras 10 in the distance measurement system 1 as described in the first embodiment is arranged on the front-side edge portion 41a and the rear-side edge portion 41b. The pair of cameras 10 is arranged at the two portions of the front-side edge portion 41a and the rear-side edge portion 41b on the center line 43 in such a manner that the optical axes 13 (FIG. 1) are oriented upward from the roof 41. This pair of cameras 10 enables all directions, from front to back and right to left of the automobile 40D, to be the distance measurement directions. By using the distance measurement system 1 including the pair of cameras 10 arranged on the front- and rear-side edge portions 41a and 41b on the center line 43, the distances to various objects that exist around the automobile 40D are also measured.

A vehicle (an automobile) 40E illustrated in FIG. 8B has a roof 41 and a front-side edge portion 41a and a rear-side edge portion 41b on the left side of a center line 43 in the forward direction of the automobile 40E. In addition, for example, a pair of cameras 10 in the distance measurement system 1 as described in the first embodiment is arranged on the front-side edge portion 41a and the rear-side edge portion 41b. The pair of cameras 10 is arranged at the two portions of the front-side edge portion 41a and the rear-side edge portion 41b on the left side of the center line 43 in such a manner that the optical axes 13 (FIG. 1) are oriented upward from the roof 41. This pair of cameras 10 enables all directions, from front to back and right to left of the automobile 40E, to be the distance measurement directions. By using the distance measurement system 1 including the pair of cameras 10 arranged on the front- and rear-side edge portions 41a and 41b on the left side of the center line 43, the distances to various objects that exist around the automobile 40E are measured.

A vehicle (an automobile) 40F illustrated in FIG. 8C has a roof 41 and a front-side edge portion 41a and a rear-side edge portion 41b on the right side of a center line 43 in the forward direction of the automobile 40F. In addition, for example, a pair of cameras 10 in the distance measurement system 1 as described in the first embodiment is arranged on the front-side edge portion 41a and the rear-side edge portion 41b. This pair of cameras 10 also enables all directions, from front to back and right to left of the automobile 40F, to be the distance measurement directions, and the distances to various objects that exist around the automobile 40F are measured.

For example, in the case of the automobile 40D illustrated in FIG. 8A, since the pair of cameras 10 is mounted on the front and back sides of the center line 43 on the roof 41, a relatively large amount of information about objects that exist in the right and left directions of the automobile 40D (for example, larger images and distances to more objects in the right and left directions) and a relatively small amount of information about the roof 41 are acquired. In the case of the automobile 40E illustrated in FIG. 8B, since the pair of cameras 10 is mounted on the front and rear sides on the left side of the center line 43 on the roof 41, a relatively large amount of information about objects on the right and left sides of the automobile 40E (for example, larger images and distances to more objects in the right and left directions) and a relatively small amount of information about the roof 41 are acquired. In the case of the automobile 40F illustrated in FIG. 8C, since the pair of cameras 10 is mounted on the front and rear sides on the right side of the center line 43 on the roof 41, a relatively large amount of information about objects on the right side of the automobile 40F (for example, larger images and distances to more objects in the right direction) and a relatively small amount of information about the roof 41 are acquired.

In an automobile with the driver's seat on the right or left side, the opposite side of the driver's seat has a larger blind area. By arranging a pair of cameras 10 on the opposite side of the driver's seat beyond the center line 43, a relatively large amount of information about the opposite side (for example, larger images and distances to more objects in the opposite direction) is acquired.

If any one of the automobiles 40D to 40F illustrated in FIGS. 8A to 8C has a hatchback door on its rear side, one of the pair of cameras 10 may be arranged on an upper surface of an upper edge portion of the hatchback door. The pair of cameras 10 may be arranged on an upper edge portion of one of the right and left doors of the automobile 40E or 40F.

As a variation of the present embodiment, the pair of cameras 10 may be arranged diagonally. For example, one camera 10 may be arranged on the right front side and the other camera 10 on the left back side on the roof of the automobile. Still alternatively, one camera 10 may be arranged on the left front side and the other camera 10 on the right back side on the roof of the automobile.

Figure 9A:
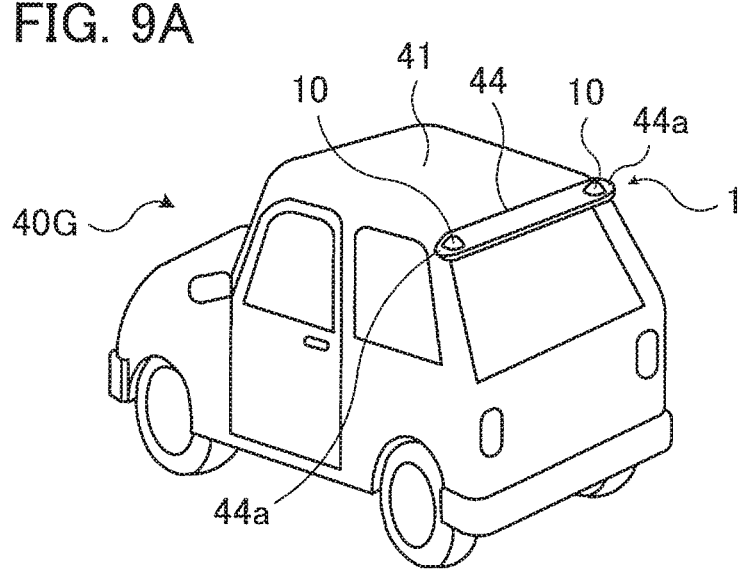
FIGS. 9A and 9B illustrate third configuration examples the distance-measurement-system-equipped vehicle according to the second embodiment.
Figure 9B:
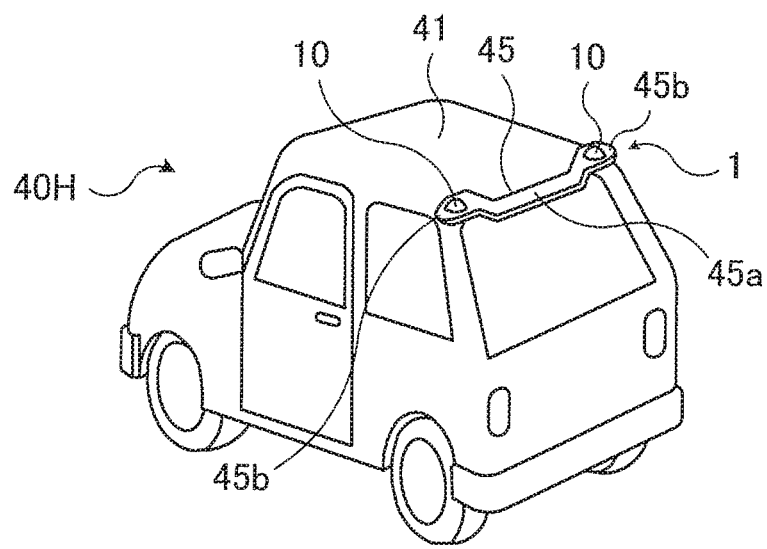

FIGS. 9A and 9B illustrate third configuration examples of the distance-measurement-system-equipped vehicle according to the second embodiment. FIGS. 9A and 9B are schematic perspective views of main portions of third configuration examples of the distance measurement system-equipped vehicle according to the second embodiment.

A vehicle (an automobile) 40G illustrated in FIG. 9A has a roof 41 and a rear spoiler 44 attached thereto. In addition, a pair of cameras in a distance measurement system, for example, a pair of cameras 10 in the distance measurement system 1 as described in the first embodiment, is arranged on right and left edge portions 44a of the rear spoiler 44. The pair of cameras 10 is arranged at the two portions of the right and left edge portions 44a in such a manner that the optical axes 13 (FIG. 1) are oriented upward from the rear spoiler 44. This pair of cameras 10 enables all directions, from front to back and right to left of the automobile 40G, to be the distance measurement directions. By using the distance measurement system 1 including the pair of cameras 10 arranged on the rear spoiler 44, the distances to various objects that exist around the automobile 40G are measured.

The shape of the rear spoiler 44 on which the pair of cameras 10 is arranged is not limited to the shape illustrated in FIG. 9A. For example, the rear spoiler may have a shape as illustrated in FIG. 9B.

A vehicle (an automobile) 40H illustrated in FIG. 9B has a rear spoiler 45 whose right and left edge portions 45b are higher than a center portion 45a. A pair of cameras 10 is arranged on these higher right and left edge portions 45b of the rear spoiler 45. This pair of cameras 10 enables all directions, from front to back and right to left of the automobile 40H, to be the distance measurement directions, and the distances to various objects that exist around the automobile 40H are measured. When the rear spoiler 45 is attached to the roof 41 at the center portion 45a, the edge portions 45b are higher than the roof 41. Thus, since a pair of cameras 10 is arranged on these edge portions 45b, smaller images about the automobile 40H are captured, and more information about objects around the automobile 40H is acquired.

If the automobile 40G or 40H illustrated in FIG. 9A or 9B has a hatchback door on its rear side, the rear spoiler 44 or 45 may be arranged on an upper surface of an upper edge portion of the hatchback door.

A pair of cameras 10 in the distance measurement system 1 may be arranged on a component attached to the roof 41 of the automobile 40G or 40H, and the component is the rear spoiler 44, a rear wing, or the like.

The component on which the distance measurement system 1 is arranged may be attached to the automobile 40G or 40H as an option. The installation position of the component is not limited to the back side of the roof of the automobile 40G or 40H. For example, the component may e installed on the front side or the center of the roof.

Figure 10A:
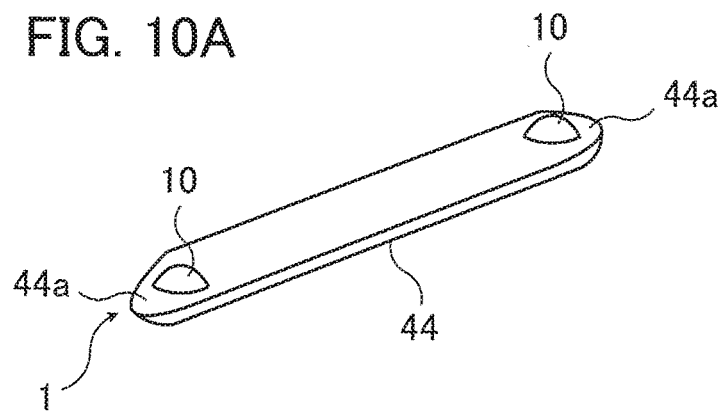
FIGS. 10A and 10B illustrate a component according to the second embodiment.
Figure 10B:
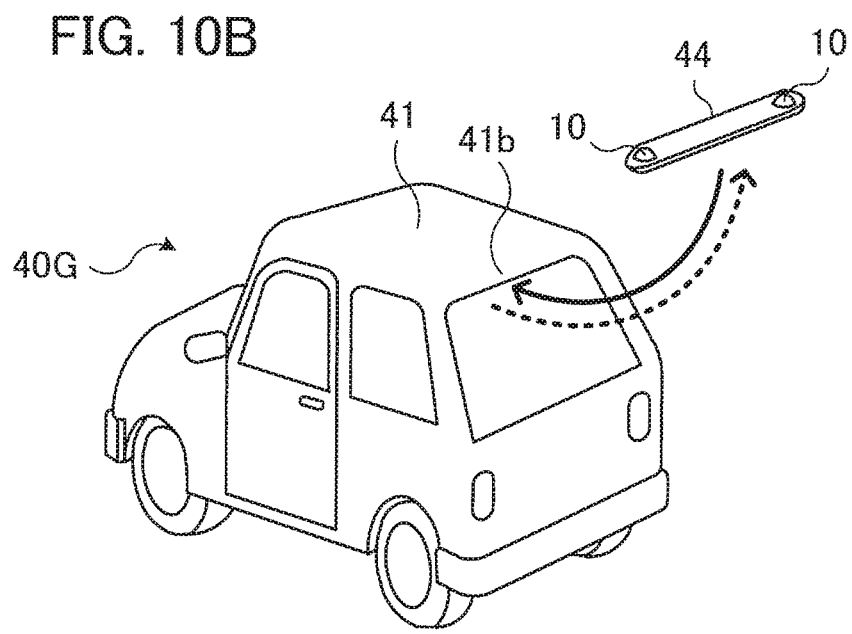

FIGS. 10A and 10B illustrate a component according to the second embodiment. FIG. 10A is a schematic perspective view of a main portion of the component not attached to the automobile 40G yet, and FIG. 10B schematically illustrates how the component is attached to the automobile 40G.

For example, the rear spoiler 44 having the right and left edge portions 44a on which a pair of cameras 10 is arranged as illustrated in FIG. 10A is prepared as an option that is attachable to the roof 41 of the automobile 40G. This rear spoiler 44 is attached to an edge portion 41b on the back side of the roof 41 of the automobile 40G in a predetermined method, as illustrated in FIG. 10B (see a thick solid arrow). The rear spoiler 44 may be removed from the automobile 40G after attached (see a thick dotted arrow).

In this way, the rear spoiler 44 (FIG. 9A) on which the distance measurement system 1 is arranged may be manufactured as a removable option. The rear spoiler 45 (FIG. 9B) may also be manufactured as a removable option.

Figure 11A:
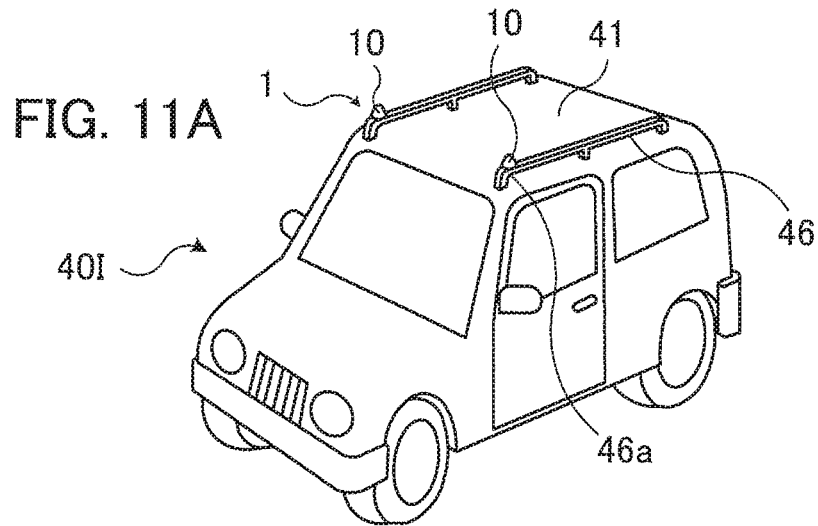
FIGS. 11A to 11C illustrate fourth configuration examples of the distance-measurement-system-equipped vehicle according to the second embodiment.
Figure 11B:
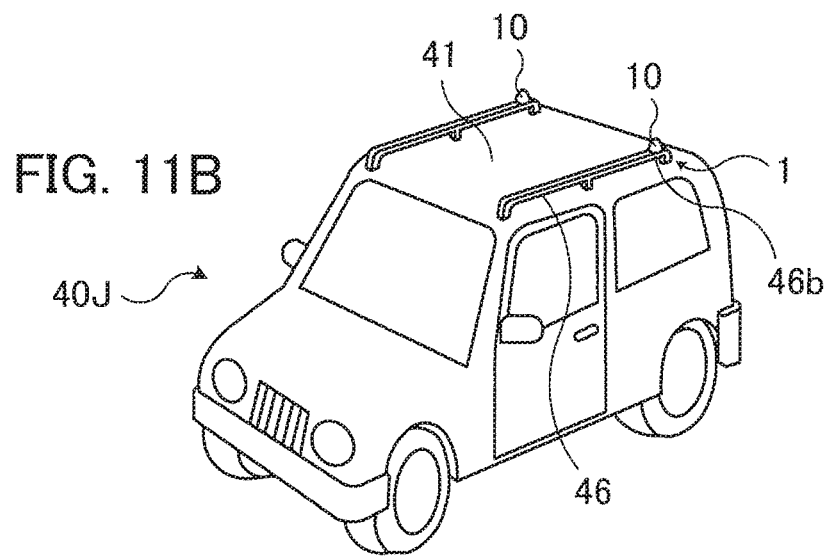
Figure 11C:
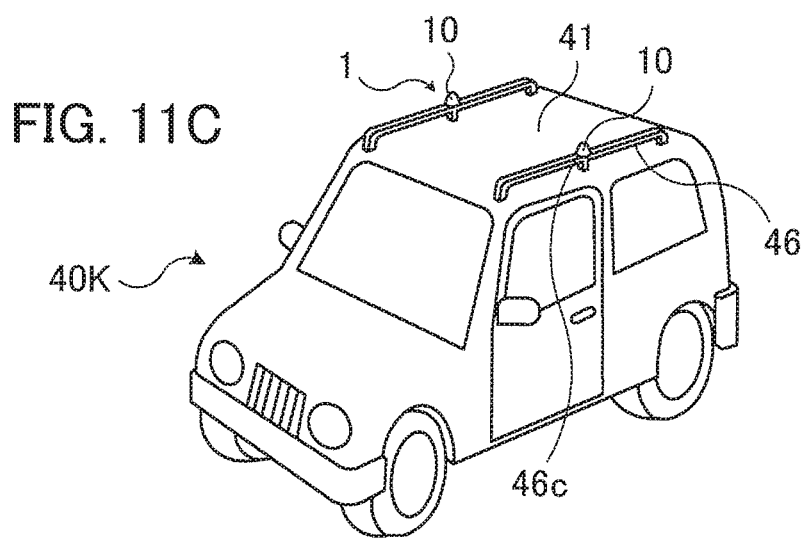

FIGS. 11A to 11C illustrate fourth configuration examples of the distance-measurement-system-equipped vehicle according to the second embodiment. FIGS. 11A to 11C are schematic perspective views of main portions of fourth configuration examples of the distance measurement system-equipped vehicle according to the second embodiment.

A vehicle (an automobile) 40I illustrated in FIG. 11A has a roof 41 and a pair of right and left roof rails (roof racks) 46. A pair of cameras 10 in the distance measurement system 1 as described in the first embodiment is arranged on edge portions 46a on the front side of the pair of right and left roof rails 46 (on the front side of the automobile 40I). The pair of cameras 10 is arranged in such a manner that the optical axes 13 (FIG. 1) are oriented upward from the roof 41 and enables all directions, from front to back and right to left of the automobile 40I, to be the distance measurement directions. By using this the distance measurement system 1, the distances to various objects that exist around the automobile 40I are measured.

A vehicle (an automobile) 40J illustrated in FIG. 11B has a pair of right and left roof rails 46. A pair of cameras 10 in the distance measurement system 1 as described in the first embodiment is arranged on edge portions 46b on the rear side of the roof rails 46 (on the rear side of the automobile 40J). By using the distance measurement system 1 including the pair of cameras 10, the distances to various objects that exist around the automobile 40J are measured.

A vehicle (an automobile) 40K illustrated in FIG. 11C has a pair of right and left roof rails 46. An individual camera 10 in the distance measurement system 1 as described in the first embodiment is arranged on a center portion 46c between a front-side edge portion 46a and a rear-side edge portion 46b. By using the distance measurement system 1 including the pair of cameras 10, the distances to various objects that exist around the automobile 40K are measured.

For example, depending on the positions of the pair of cameras 10 on the roof rails 46, a relatively large amount of information about objects in a certain direction such as the front, back, right, or left direction is acquired (for example, larger images and distances to more objects in the certain direction). In addition, a relatively small amount of information about the roof 41 is acquired.

Figure 12:
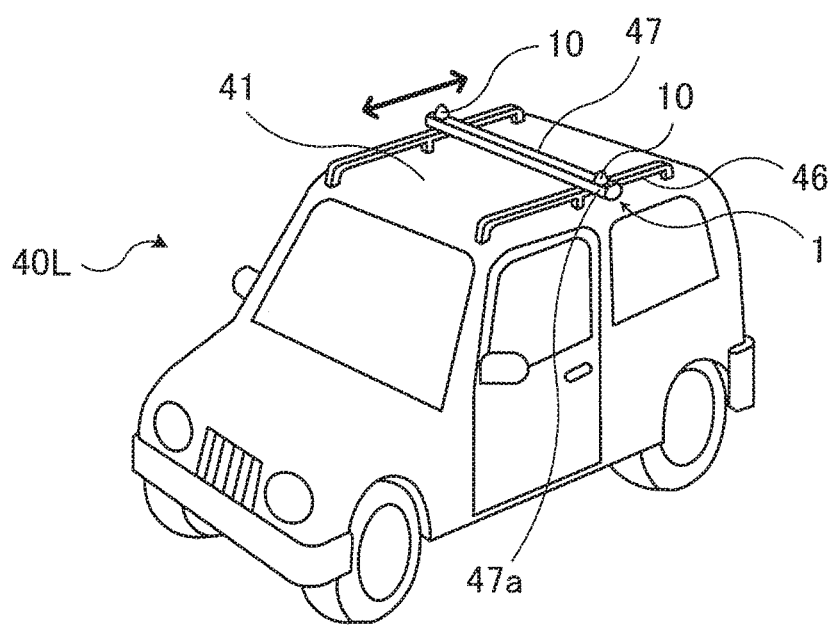
FIG. 12 illustrates a fifth configuration example of the distance-measurement-system-equipped vehicle according to the second embodiment.

FIG. 12 illustrates a fifth configuration example of the distance-measurement-system-equipped vehicle according to the second embodiment. More specifically, FIG. 12 is a schematic perspective view of a main portion of a fifth configuration example of the distance-measurement-system-equipped vehicle according to the second embodiment.

A vehicle (an automobile) 40L illustrated in FIG. 12 has a roof carrier 47 attached to roof rails 46. A pair of cameras 10 in the distance measurement system 1 as described in the first embodiment is arranged on right and left edge portions 47a of the roof carrier 47. The pair of cameras 10 is arranged in such a manner that the optical axes 13 (FIG. 1) are oriented upward from a roof 41 and enables all directions, from front to back and right to left of the automobile 40L, to be the distance measurement directions. By using this the distance measurement system 1, the distances to various objects that exist around the automobile 40L are measured.

As illustrated by the automobile 40L, the pair of cameras 10 in the distance measurement system 1 may be arranged on the roof carrier 47 subsequently attachable to and removable from the roof rails 46. In addition, by changing the position of the roof carrier 47 on the roof rails 46 (for convenience, the movement of the roof carrier 47 is indicated by a thick arrow in FIG. 12), it is possible to arrange the pair of cameras 10 in the distance measurement system 1 on the front or rear side of the automobile 40L or on a position between the front and rear sides.

As illustrated by each of the automobiles 40A to 40L according to the second embodiment, it is possible to mount the distance measurement system 1 without deteriorating the original design of the automobile. In addition, by arranging an individual camera 10 on a portion higher than a roof 41, the rear spoiler 44 or 45, a roof rail 46, or a roof carrier 47, even when any one of the automobiles 40A to 40L with the distance measurement system 1 drives, the air resistance is maintained at a low level.

In addition, by incorporating the distance measurement system 1 in an option such as the rear spoiler 44, for example, by mounting the distance measurement system 1 as a factory-installed option on an automobile, since the installation process of the distance measurement system 1 is separated from the assembly process of the automobile, the manufacturing process is made simpler.

If the distance measurement system 1 is mounted on an automobile as a dealer-installed option or after purchase, it is sufficient to attach an option such as the rear spoiler 44 including the distance measurement system 1 to the automobile. Various kinds of work, for example, for attaching the individual cameras 10 to the rear spoiler 44 or the like, adjusting the optical axes 13, and adjusting the positional relationship between the pair of cameras 10 are omitted. Thus, the work process is made simpler.

The second embodiment has been described by using the automobiles 40A to 40L on which the distance measurement system 1 using the cameras 10 as illustrated in FIG. 1 described in the above first embodiment is mounted. However, various automobiles on which a distance measurement system using the cameras 10a or 10b as illustrated in FIG. 2A or 2B is mounted are realized in the same way in accordance with any one of the examples in FIGS. 7A to 7C, FIGS. 8A to 8C, FIGS. 9A and 9B, and FIGS. 11A to 11C.

In addition, while the above description has been made by using automobiles as vehicles, examples of the vehicles on which the distance measurement system 1 or the like is mounted include large automobiles such as trucks and buses, special-purpose vehicles such as snow blowers, excavators, and combines, and agricultural vehicles. In addition, examples of the vehicles include one- or two-seater micro mobilities, various kinds of motorcycles and tricycles such as motorbikes, light vehicles such as bicycles, wheelchairs, and trains such as electric railcars and monorails. For example, the distance measurement system 1 or the like is realized by arranging a pair of cameras such as cameras 10 on an upper surface of an upper part of a vehicle or on an upper surface of component mounted on an upper part of a vehicle.

Next, a third embodiment will be described.

Figure 13:
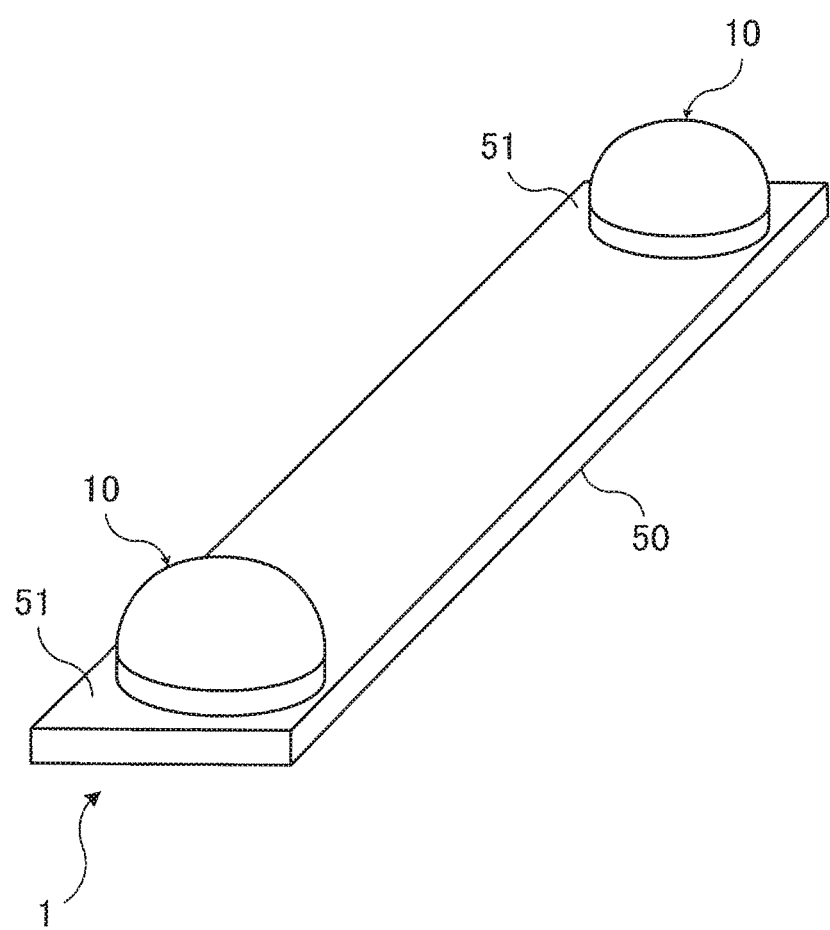
FIG. 13 illustrates an example of a distance measurement system according to a third embodiment.

FIG. 13 illustrates an example of a distance measurement system according to the third embodiment. More specifically, FIG. 13 is a schematic perspective view of a main portion of an example of a distance measurement system according to the third embodiment.

For example, a pair of cameras 10 in the distance measurement system 1 is connected to each other via a common connection member (a frame) 50, as illustrated in FIG. 13. For example, a plate-like member as illustrated in FIG. 13 is used as the frame 50. Other than a plate-like member, a rod-like member may be used as the frame 50. For example, the pair of cameras 10 in the distance measurement system 1 (FIG. 1) described in the above first embodiment is fixed at two opposing end portions 51 of the frame 50. A positional relationship between the pair of cameras 10 connected to each other on the frame 50 is accurately adjusted, and the positional relationship is effectively maintained after adjusted.

The stereo distance measurement in the distance measurement system 1 is a technique of comparing a mapping obtained by one camera with that obtained by the other camera and calculating a distance from a shift amount (parallax value) between coordinates of a measurement target object indicated in the respective mappings. Thus, it is desirable that the pair of cameras be attached accurately and maintained at the same positions. Namely, even if the pair of cameras 10 is accurately positioned when the distance measurement system 1 is initially mounted on the mobile object 20 such as a vehicle, if the positional relationship is changed, for example, by the movement or sway of the mobile object 20 after the distance measurement system 1 is mounted, it is difficult to perform reliable distance measurement by accurately calculating the parallax, measurement errors, variations, etc.

However, as illustrated in FIG. 13, by connecting the pair of cameras 10 to each other on the frame 50, it is possible to effectively prevent the pair of cameras 10 from shifting by the movement or sway of the mobile object 20 on which the distance measurement system 1 is mounted. It is desirable that highly rigid material that prevents misalignment between the pair of cameras 10 be used for the frame 50.

For example, this pair of cameras 10 connected to each other on the frame 50 is mounted on a vehicle such as an automobile.

Figure 14A:
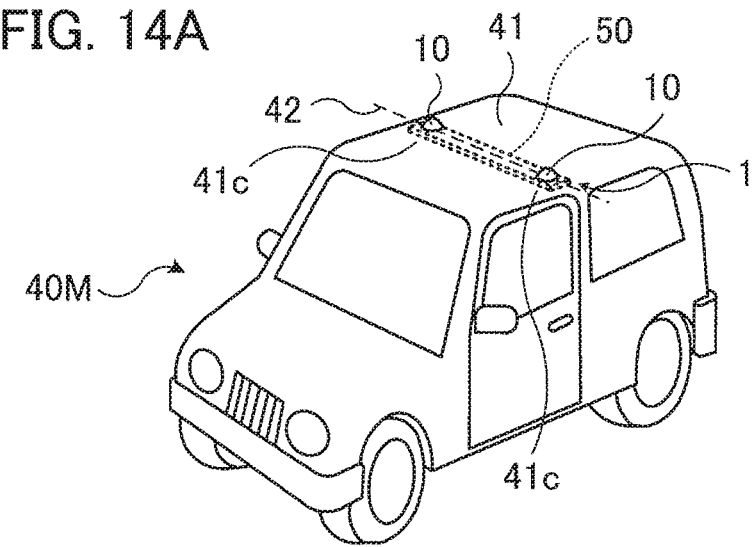
FIGS. 14A and 14B illustrate examples of a distance-measurement-system-equipped vehicle according to the third embodiment.
Figure 14B:
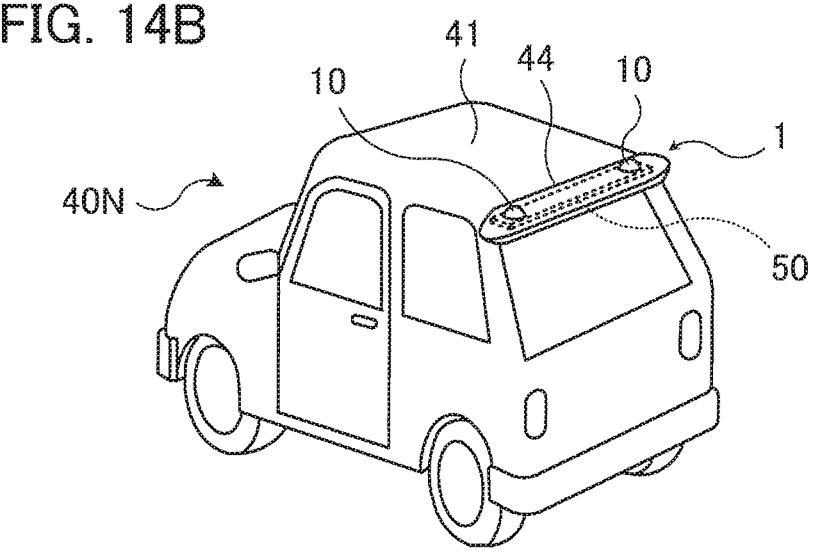

FIGS. 14A and 14B illustrate examples of a distance-measurement-system-equipped vehicle according to the third embodiment. More specifically, FIG. 14A is a schematic perspective view of a main portion of a first configuration example of a distance-measurement-system-equipped vehicle according to the third embodiment. FIG. 14B is a schematic perspective view of a main portion of a second configuration example of the distance-measurement-system-equipped vehicle according to the third embodiment. The following examples will be described assuming that the distance measurement system 1 (FIG. 1) described in the above first embodiment is mounted on vehicles.

For example, as illustrated in FIG. 14A, the frame 50 connecting the pair of cameras 10 is held and fixed inside a roof 41 of a vehicle (an automobile) 40M. The pair of cameras 10 connected on the frame 50 is arranged outside the roof 41. By using the distance measurement system 1 including this pair of cameras 10, the distances to various objects that exist around the automobile 40M are measured. In addition, since the pair of cameras 10 is connected to each other on the frame 50 held inside the roof 41, misalignment in the positional relationship between the cameras 10 is prevented. Consequently, reliable distance measurement is performed by accurately calculating the parallax, measurement errors, variations, etc.

FIG. 14A illustrates an example in which the frame 50 is held inside the roof 41 in such a manner that the pair of cameras 10 is positioned on the right and left edge portions 41c of a center line 42. However, the frame 50 may be held inside the roof 41 in such a manner that the pair of cameras 10 is positioned on a front-side edge portion 41a or a rear-side edge portion 41b. Alternatively, the frame 50 may be held inside the roof 41 in such a manner that the pair of cameras 10 is positioned on a front-side edge portion 41a and a rear-side edge portion 41b.

As illustrated in FIG. 14B, the frame 50 connecting the pair of cameras 10 is held and fixed inside a rear spoiler 44 attached to a roof 41 of a vehicle (an automobile) 40N. The pair of cameras 10 connected on the frame 50 is arranged outside the rear spoiler 44. By using the distance measurement system 1 including this pair of cameras 10, the distances to various objects that exist around the automobile 40N are measured. In addition, since the pair of cameras 10 is connected to each other on the frame 50 held inside the rear spoiler 44, misalignment in the positional relationship between the cameras 10 is prevented. Consequently, reliable distance measurement is performed by accurately calculating the parallax, measurement errors, variations, etc.

The third embodiment has been described by using examples in which the pair of cameras 10 as illustrated in FIG. 1 is connected to each other on the frame 50 and in which the distance measurement system 1 including the pair of cameras 10 connected on the frame 50 is mounted on each of the automobiles 40M and 40N. The third embodiment may also realize various automobiles equipped with a distance measurement system including the frame 50 connecting a pair of cameras 10a as illustrated in FIG. 2A in accordance with the examples in FIG. 14A or 14B. Alternatively, the third embodiment may also realize various automobiles equipped with a distance measurement system including the frame 50 connecting a pair of cameras 10b as illustrated in FIG. 2B in accordance with the examples in FIG. 14A or 14B.

Next, a fourth embodiment will be described.

Figure 15:
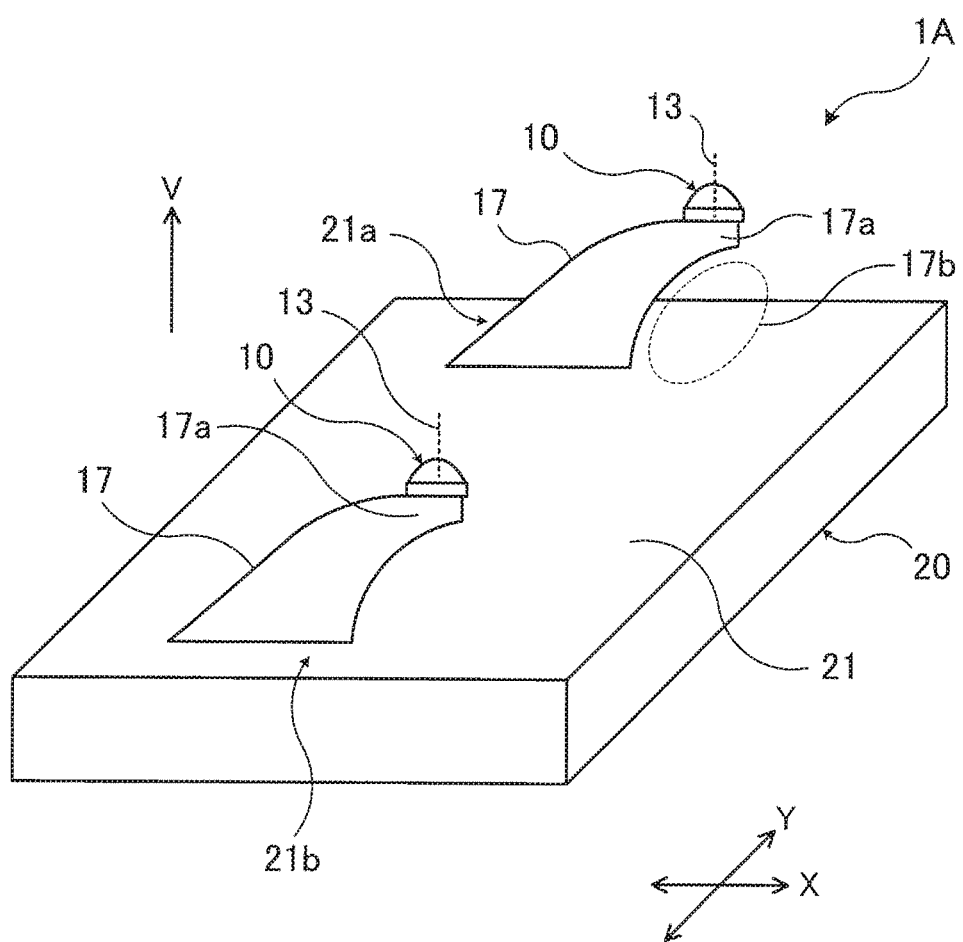
FIG. 15 illustrates an example of a distance measurement system according to a fourth embodiment.

FIG. 15 illustrates an example of a distance measurement system according to the fourth embodiment. More specifically, FIG. 15 is a schematic perspective view of a main portion of an example of a distance-measurement-system-equipped vehicle according to the fourth embodiment.

This distance measurement system 1A illustrated in FIG. 15 includes a pair of shark-fin-like supporting members 17 that protrude from an upper surface 21 of a mobile object 20. For example, a pair of cameras 10 as illustrated in FIG. 1 is arranged on end portions 17a of the pair of supporting members 17. In this respect, the distance measurement system 1A illustrated in FIG. 15 differs from the distance measurement system 1 according to the above first embodiment.

By arranging a camera 10 on the end portion 17a of each supporting member 17, the distance measurement system 1A including the pair of cameras 10 above different portions 21a and 21b of the upper surface 21 is realized. Each of the cameras 10 has its optical axis 13 oriented in the upper direction V and is held by the corresponding supporting member 17. By using the distance measurement system 1A the pair of cameras 10 held as described above, the distances to various objects that exist around the mobile object 20 are measured.

It is preferable that the mobile object 20 move forward in an X direction illustrated in FIG. 15, to reduce the air resistance that the supporting members 17 receive when the mobile object 20 moves. However, the present embodiment is not limited to this example.

As illustrated in FIG. 15, in the distance measurement system 1A, each of the supporting members 17 protruding from the upper surface 21 of the mobile object 20 is configured to have a curved shark-fin-like shape so that space 17b is formed between the corresponding end portion 17a and the upper surface 21 of the mobile object 20. Each of the cameras 10 is arranged on the end portion 17a of the corresponding supporting member 17 having a shark-fin-like shape.

Since the cameras 10 are arranged on the end portions 17a of the supporting members 17, the cameras 10 are held at even higher positions from the upper surface 21 of the mobile object 20. Consequently, since the images captured by the cameras 10 include smaller images of the mobile object 20, more information about objects around the mobile object 20 is acquired.

In addition, since the space 17b is arranged below each of the cameras 10, an image acquired by one camera 10 includes a smaller blind area, which is created by the other supporting member 17 on the side where the other camera 10 and the other supporting member 17 are located. Thus, more information about objects around the mobile object 20 is acquired.

Figure 16A:
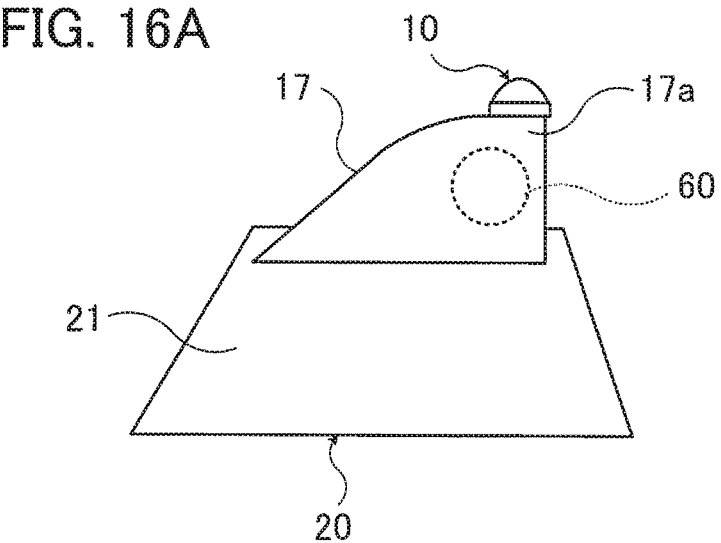
FIGS. 16A and 16B illustrate a blind area created by a supporting member according to the fourth embodiment.
Figure 16B:
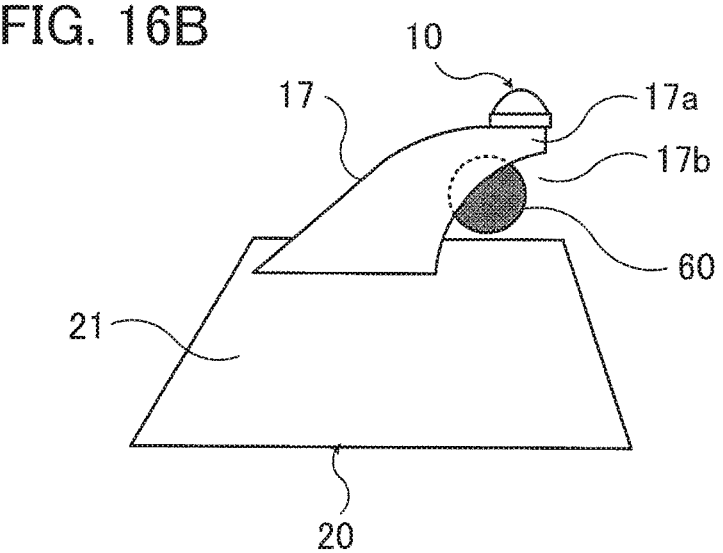

FIGS. 16A and 16B illustrate a blind area created by a supporting member according to the fourth embodiment.

More specifically, each of FIGS. 16A and 16B schematically illustrates an image captured by one camera 10, the individual image depicting the side where the other camera 10 and supporting member 17 are located. FIG. 16A illustrates a case in which the space 17b is not formed between the end portion 17a of the corresponding supporting member 17 and the upper surface 21 of the mobile object 20. FIG. 16B illustrates a case in which the space 17b is formed between the end portion 17a of the corresponding supporting member 17 and the upper surface 21 of the mobile object 20.

As illustrated in FIG. 16A, if the space 17b is not formed between the end portion 17a of the other supporting member 17 and the upper surface 21 of the mobile object 20, when one camera 10 captures an image on the side where the other camera 10 and supporting member 17 are located, a blind area is included in the image by the other supporting member 17. Thus, an object 60 that exists beyond the other camera 10 and supporting member 17 is not captured by one camera 10. While the object 60 is captured by the other camera 10, the distance measurement technique performed based on images captured by the pair of cameras 10 fails to obtain information about the object 60.

In contrast, as illustrated in FIG. 16B, if the space 17b is created between the end portion 17a of the supporting member 17 and the upper surface 21 of the mobile object 20, when one camera 10 captures an image on the side where the other camera 10 and supporting member 17 are located, at least a part of the object 60 is included in the image through the space 17b. Thus, information about the object 60 is acquired from the images that include the object 60 and that are captured by the two cameras 10.

In this way, in the distance measurement system 1A, since the space 17b is arranged between the end portion 17a of the individual supporting member 17 and the upper surface 21 of the mobile object 20, a smaller blind area is created by the supporting member 17. Thus, more information about objects around the mobile object 20 is acquired.

It is possible to mount the distance measurement system 1A according to the fourth embodiment on various kinds of vehicle. For example, the supporting members 17 and the cameras 10 in the distance measurement system 1A may be arranged on a roof 41 of an automobile in accordance with any one of the examples in FIGS. 7A to 7C and FIGS. 8A to 8C described in the above second embodiment. In addition, as described in the above second embodiment, the supporting members 17 and the cameras 10 may be arranged diagonally on a roof 41 of an automobile. If the automobile has a hatchback door on its rear side, the supporting members 17 and the cameras 10 may be arranged on an upper edge portion of the hatchback door.

The supporting members 17 and the cameras 10 in the distance measurement system 1A may be arranged on a component such as the rear spoiler 44 or 45 attached to a roof in accordance with one of the examples in FIGS. 9A and 9B described in the above second embodiment.

Alternatively, in accordance with one of the examples in FIGS. 10A and 10B described in the above second embodiment, the rear spoiler 44 or 45 to which the supporting members 17 and the cameras 10 in the distance measurement system 1A are attached may be prepared as an automobile-mountable option and attached to or removed from an automobile.

Still alternatively, the supporting members 17 and the cameras 10 in the distance measurement system 1A may be arranged on the roof rails 46 in accordance with any one of the examples in FIGS. 11A to 11C described in the above second embodiment. Still alternatively, the supporting members 17 and the cameras 10 may be arranged on the roof carrier 47 attached to the roof rails 46 in accordance with the example in FIG. 12.

Still alternatively, the pair of supporting members 17 supporting the cameras 10 in the distance measurement system 1A according to the fourth embodiment may be connected by the frame 50 in accordance with the example in FIG. 13 described in the above third embodiment so that the misalignment between the pair of cameras 10 is prevented.

The frame 50 connecting the pair of supporting members 17 supporting the cameras 10 may be held inside vehicle such as an automobile.

For example, when the frame 50 is held inside an automobile, the frame 50 may be held inside the roof 41 of the automobile in accordance with the example in FIG. 14A described in the above third embodiment. In this case, the pair of supporting members 17 connected by the frame 50 is protruded from the roof 41. In this way, the cameras 10 are arranged on the end portions 17a of the supporting members 17 protruding from the roof 41.

Alternatively, in accordance with the example in FIG. 14B described in the above third embodiment, the frame 50 may be held inside the rear spoiler 44 attached to the roof 41 of the automobile. In this case, the pair of supporting members 17 connected by the frame 50 is protruded from the rear spoiler 44. In this way, the cameras 10 are arranged on the end portions 17a of the supporting members 17 protruding from the rear spoiler 44.

Still alternatively, a pair of cameras 10a illustrated in FIG. 2A or a pair of cameras 10b illustrated in FIG. 2B may be arranged on the end portions 17a of the supporting members 17. Even when the cameras 10a or the cameras 10b are arranged on the end portions 17a of the supporting members 17, similar advantages to those obtained by arranging the cameras 10 are obtained.

Next, a fifth embodiment will be described.

FIG. 17 illustrates an example of a distance measurement system according to the fifth embodiment. More specifically, FIG. 17 is a schematic perspective view or a main portion of an example of a distance measurement system according to the fifth embodiment.

This distance measurement system 1B illustrated in FIG. 17 includes a pair of columnar supporting members 18 protruding from an upper surface 21 of a mobile object 20. For example, a pair of cameras 10 as illustrated in FIG. 1 is arranged on end portions 18a of the pair of supporting members 18. In this respect, the distance measurement system 1B illustrated in FIG. 17 differs from the distance measurement system 1 according to the above first embodiment.

By arranging the pair of cameras 10 on the end portions 18a of the pair of supporting members 18, the distance measurement system 1B including the pair of cameras 10 above different portions 21a and 21b of the upper surface 21 is realized. The cameras 10 are supported by the respective supporting members 18 in such a manner that the optical axes 13 are oriented upward in the upper direction V. By using the distance measurement system 1B including the pair of cameras 10 held as described above, the distances to various objects that exist around the mobile object 20 are measured.

The mobile object 20 may move forward in an X or Y direction illustrated in FIG. 17.

For example, the columnar supporting members 18 in the distance measurement system 1B illustrated in FIG. 17 may be formed to stand upright on the upper surface 21 ($\theta=90°$). However, in this case, depending on the thickness of each supporting member 18 and the positional relationship between each camera 10 (or each supporting member 18) above the upper surface 21 and an object, blind area is created. Thus, the range of detecting the objects that exist around the mobile object 20 could be narrowed.

Figure 18A:
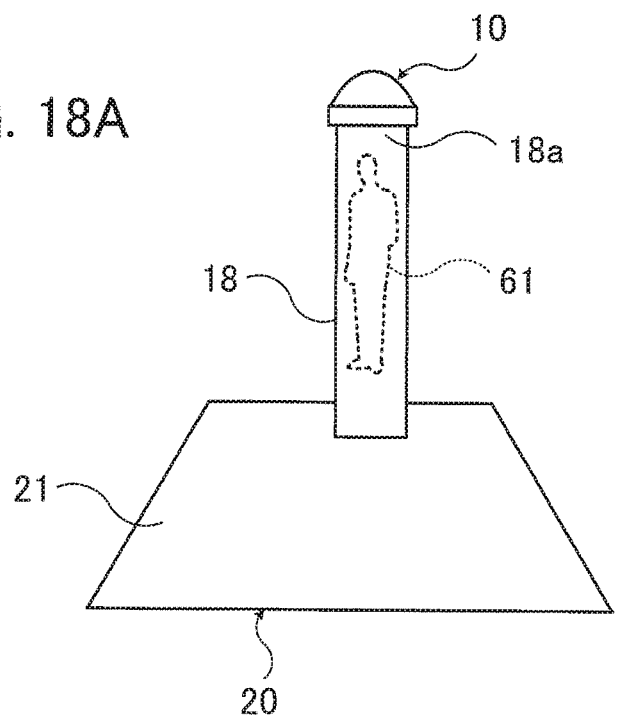
FIGS. 18A and 18B illustrate a blind area created by a supporting member according to the fifth embodiment.
Figure 18B:
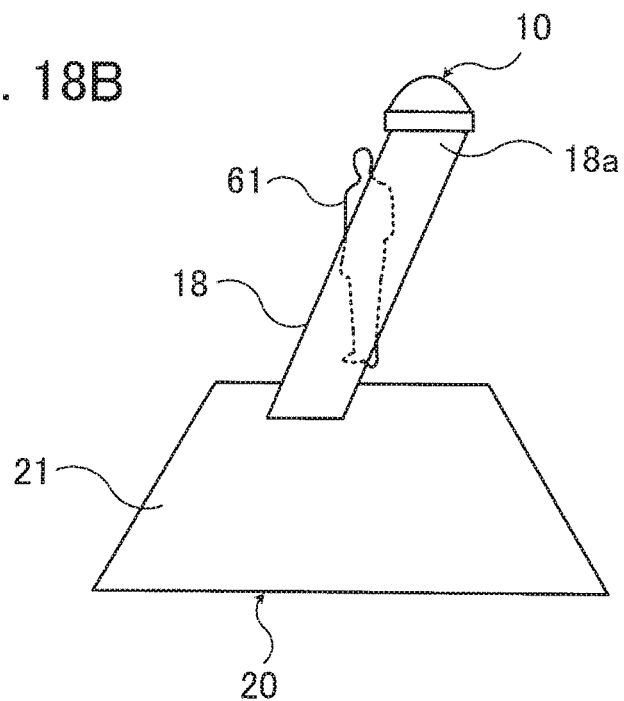

FIGS. 18A and 18B illustrate a blind area created by a supporting member according to the fifth embodiment.

More specifically, each of FIGS. 18A and 18B schematically illustrates an image captured by one camera 10, the images depicting the side where the other camera and supporting member 18 are located. FIG. 18A illustrates a case in which the supporting members 18 are formed to stand upright, and FIG. 18B illustrates a case in which the supporting members 18 are formed to be inclined.

If the columnar supporting members 18 are formed to stand upright on the upper surface 21, when one camera 10 captures an image on the side where the other camera 10 and supporting member 18 are located, the other supporting member 18 could hide an object 61 such as a person or an obstacle (a person is illustrated as an example in FIG. 18A), as illustrated in FIG. 18A. In many cases, such an object 61 as a person or an obstacle stands upright on the ground. Thus, if the columnar supporting members 18 are formed to stand upright on the upper surface 21, the situation as illustrated in FIG. 18A could occur.

In contrast, if the columnar supporting members 18 are formed to be inclined, when one camera 10 captures an image on the side where the other camera 10 and supporting member 18 are located, a situation as illustrated in FIG. 18B could be created. Namely, even when there is the object 61 such as a standing person or obstacle (a person is illustrated as an example in FIG. 18B), the situation in which at least a part of the object 61 is not hidden by the supporting member 18 under the other camera 10 is created, as illustrated in FIG. 18B. In this way, information about the object 61 is acquired from an image captured by one camera 10, the image including at least a part of the object 61 not hidden by the other supporting member 18 (at least a part of the outline of the object 61 in the vertical direction thereof), and an image captured by the other camera 10 located on the side of the object 61, the image including an image of the object 61.

The angle $\theta$ (FIG. 17) of each columnar supporting member 18 with respect to the upper surface 21 may be set to fall within the range of more than 0 degree to less than 90 degrees ($0°<\theta<90°$). In addition, considering the blind area as illustrated in FIG. 18A, it is preferable that the angle $\theta$ (FIG. 17) with respect to the upper surface 21 fall within the range of more than 20 degrees to less than 70 degrees ($20°<\theta<70°$).

Depending on the thicknesses of the individual columnar supporting members 18, even when the columnar supporting members 18 are formed to stand upright on the upper surface 21, there are cases in which at least a part of the object 61 such as a standing person or obstacle is not hidden by the supporting member 18 under the other camera 10.

In addition, depending on the heights of the individual cameras 10 supported by the supporting member 18 from the upper surface 21, even when the supporting members 18 are formed to stand upright on the upper surface 21, a situation in which at least a part of the object 61 is not hidden is created. In addition, by inclining at least one of the supporting members 18, a situation in which at least a part of the object 61 is not hidden is created. The heights of the cameras 10 are set, for example, based on the detection range needed in the distance measurement system 1B.

Figure 19:
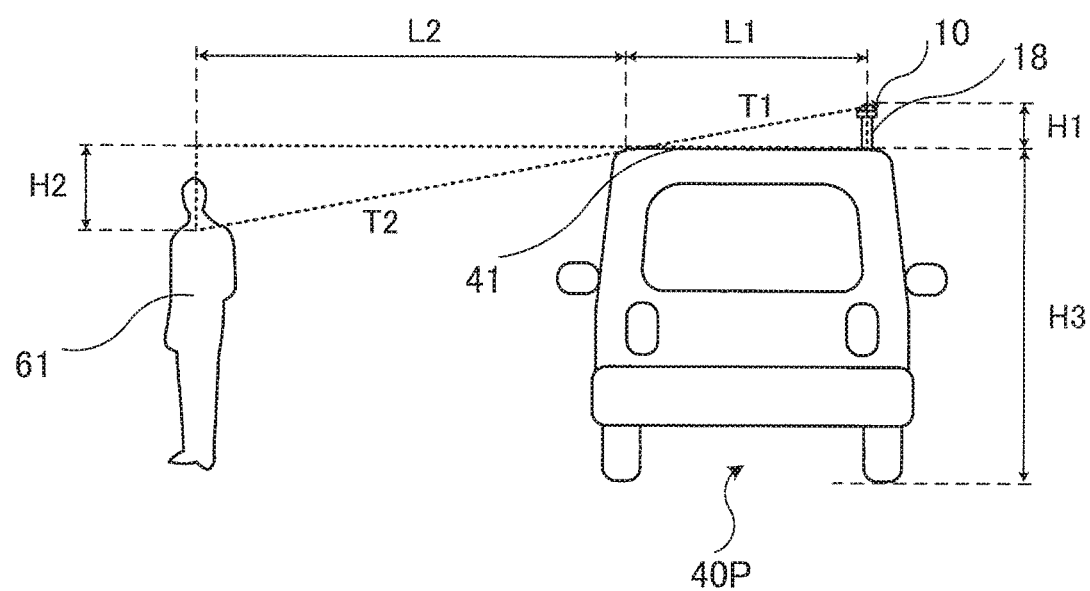
FIG. 19 illustrates the height of a camera according to the fifth embodiment.

FIG. 19 illustrates the height of a camera according to the fifth embodiment.

Hereinafter, an example in which a columnar supporting member 18 holding a camera 10 is arranged on a roof 41 of an automobile 40P will be described.

A height H1 of the camera 10 from the roof 41 is set based on a distance L1 between the camera 10 and an end of the roof 41 and a detection range distance L2 and height H2. For example, when the distance L1 between the camera 10 and the end of the roof 41 is 160 cm, the detection range distance L2 is 320 cm, and the height H2 is 30 cm, the height H1 of the camera 10 is set to be 15 cm from the similarity relationship between triangles T1 and T2. For example, a height H3 of the roof 41 of the automobile 40P is 180 cm. In this case, only a part of the object 61, the part at a height of 150 cm (H3−H2=150 cm) or more above the ground level, is captured by the camera 10.

The length of the supporting member 18 supporting the camera 10 is determined from the height H1 of the camera 10 set as described above and the angle θ of the supporting member 18 with respect to the vertical direction V.

It is possible to mount this distance measurement system 1B according to the fifth embodiment on various kinds of vehicle. For example, the supporting members 18 and the cameras 10 in the distance measurement system 1B may be arranged on a roof 41 of an automobile in accordance with any one of the examples in FIGS. 7A to 7C and FIGS. 8A to 8C described in the above second embodiment. Alternatively, as described in the above second embodiment, the supporting members 18 and the cameras 10 may be arranged diagonally on a roof 41 of an automobile. If the automobile has a hatchback door on its rear side, the supporting members 18 and the cameras 10 may be arranged on an upper edge portion of the hatchback door.

Still alternatively, the supporting members 18 and cameras 10 in the distance measurement system 1B may be arranged on a component such as the rear spoiler 44 or 45 attached to a roof in accordance with one of the examples in FIGS. 9A and 9B described in the above second embodiment.

Still alternatively, in accordance with one of the examples in FIGS. 10A and 10B described in the above second embodiment, the rear spoiler 44 or 45 to which the supporting members 18 and the cameras 10 in the distance measurement system 1B are attached may be prepared as an automobile-mountable option and attached to or removed from an automobile.

Still alternatively, the supporting members 18 and the cameras 10 in the distance measurement system 1B may be arranged on the roof rails 46 in accordance with any one of the examples in FIGS. 11A to 11C described in the above second embodiment. Still alternatively, the supporting members 18 and the cameras 10 may be arranged on the roof carrier 47 attached to the roof rails 46 in accordance with the example in FIG. 12.

Alternatively, the pair of supporting members 18 supporting the cameras 10 in the distance measurement system 1B according to this fifth embodiment may be connected by the frame 50 in accordance with the example in FIG. 13 described in the above third embodiment so that the misalignment between the pair of cameras 10 is prevented.

The frame 50 connecting the pair of supporting members 18 supporting the cameras 10 may be held inside a vehicle such as an automobile.

For example, when the frame 50 is held inside an automobile, the frame 50 may be held inside the roof 41 of the automobile in accordance with the example in FIG. 14A described in the above third embodiment. In this case, the pair of supporting members 18 connected by the frame 50 is protruded from the roof 41. In this way, the cameras 10 are arranged on the end portions 18a of the supporting members 18 protruding from the roof 41.

Alternatively, in accordance with the example in FIG. 14B described in the above third embodiment, the frame 50 may be held inside the rear spoiler 44 attached to the roof 41 of the automobile. In this case, the pair of supporting members 18 connected by the frame 50 is protruded from the rear spoiler 44. In this way, the cameras 10 are arranged on the end portions 18a of the supporting members 18 protruding from the rear spoiler 44.

Still alternatively, pair of cameras 10a illustrated in FIG. 2A or a pair of cameras 10b illustrated in FIG. 2B may be arranged on the end portions 18a of the supporting members 18. Even when the cameras 10a or the cameras 10b are arranged on the end portions 18a of the supporting members 18, similar advantages to those obtained by arranging the cameras 10 are obtained.

The angles θ of the individual supporting members 18 with respect to the upper surface 21 may be adjusted.

Figure 20A:
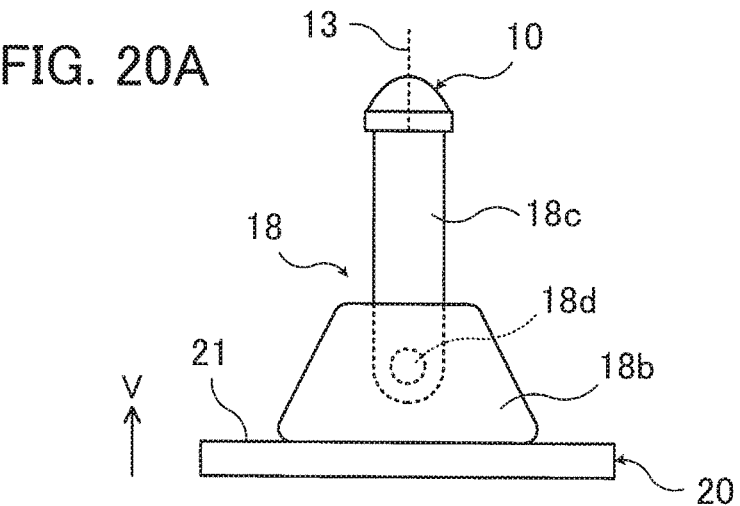
FIGS. 20A to 20C illustrate a first configuration example of an angle adjustment mechanism of a supporting member according to the fifth embodiment.
Figure 20B:
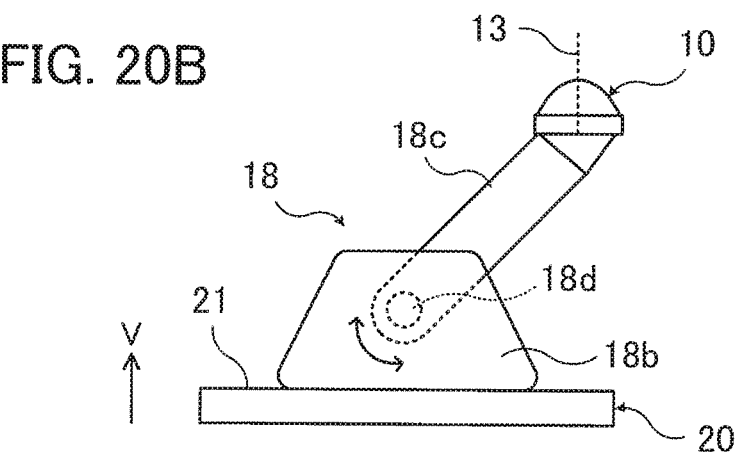
Figure 20C:
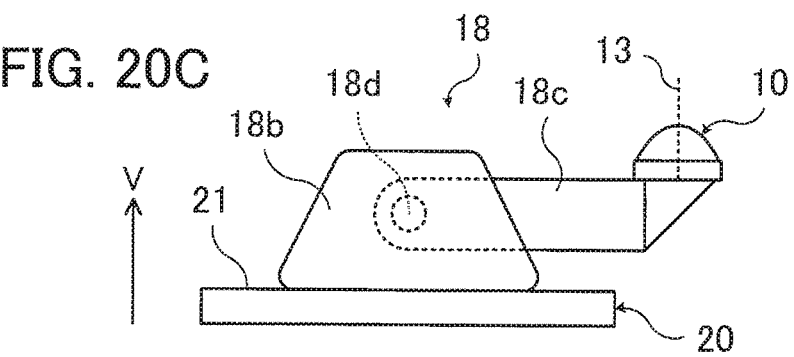

FIGS. 20A to 20C illustrate a first configuration example of an angle adjustment mechanism of a supporting member according to the fifth embodiment. More specifically, FIGS. 20A to 20C are schematic side views of a main portion of an example of a supporting member according to the fifth embodiment.

For example, as illustrated in FIG. 20A, a supporting member 18 includes a base unit 18b and supporting column 18c. The base unit 19b is fixed on an upper surface 21 of a mobile object 20 such as on the roof of an automobile. For example, the supporting column 13c is supported by a shaft 18d arranged in the base unit 18b and is formed to be rotatable about the shaft 18d. A camera 10 is arranged on an end portion of the supporting column 18c (on the end portion 18a of a supporting member 18).

The supporting member 18 is adjusted by rotating the supporting column 18c from the upright position as illustrated in FIG. 20A to a position as illustrated in FIG. 20B in which the supporting column 18c is inclined at a certain angle less than 90 degrees or to a position as illustrated in FIG. 20C in which the supporting column 18c is inclined at an angle of 90 degrees about the shaft 18d. The rotation (the adjustment of the angle) of the supporting column 18c may be performed automatically or manually.

When the angle of the supporting column 18c is adjusted by rotation, for example, a mechanism of keeping the orientation of the optical axis 13 of the camera 10 upward from the upper surface 21 after the supporting column 18c is rotated is arranged. With this mechanism, as long as the supporting column 18c has an angle within its rotatable range, the distances to various objects that exist around the mobile object 20 are measured by the pair of cameras 10 whose optical axes 13 are oriented upward from the upper surface 21.

In addition, when the angle of the supporting column 18*c* is adjusted by rotation, for example, a mechanism of fixing the supporting column 18*c* at a certain angle after the supporting column 18*c* is rotated at the certain angle is arranged. With this mechanism, the position of the camera 10 on the end portion of the supporting column 18*c* is stabilized. Consequently, accurate distance measurement is performed by accurately calculating measurement errors, variations, etc.

When a supporting member 18 is configured as described above, the supporting column 18*c* may be positioned as illustrated in FIG. 20A or 20B when used (when distance measurement is performed) and may be positioned as illustrated in FIG. 20C when not used.

Figure 21A:
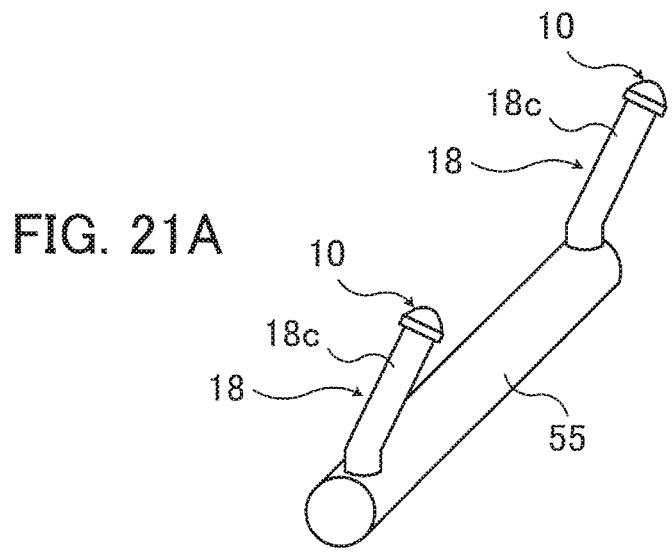
FIGS. 21A to 21C illustrate a second configuration example of the angle adjustment mechanism of supporting members according to the fifth embodiment.
Figure 21B:
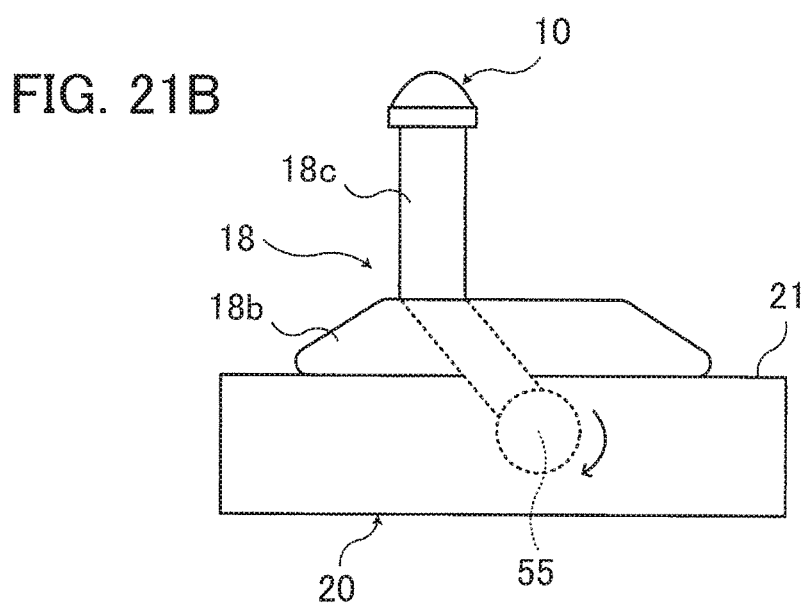
Figure 21C:
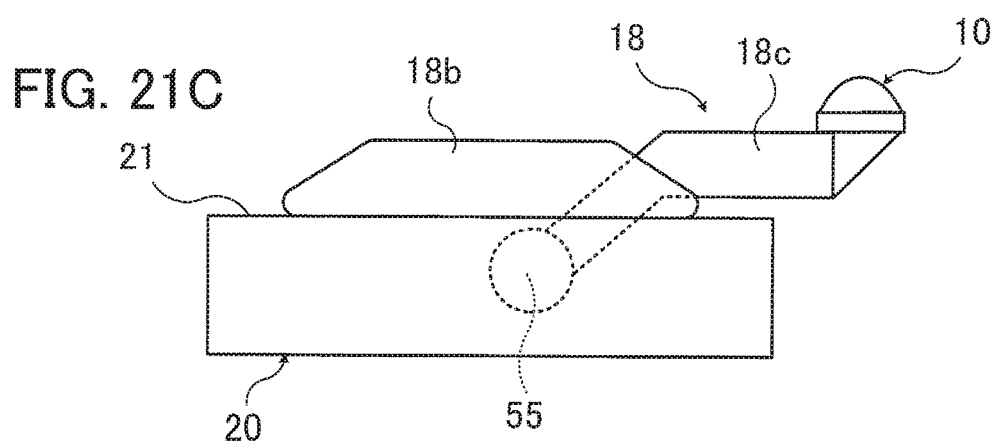

FIGS. 21A to 21C illustrate a second configuration example of the angle adjustment mechanism of supporting members according to the fifth embodiment.

FIG. 21A is a schematic perspective view of a main portion of an example of an individual supporting member according to the fifth embodiment. FIGS. 21B and 21C are schematic side views of main portions of examples of a supporting member according to the fifth embodiment.

For example, as illustrated in FIGS. 21A to 21C, a pair of supporting members 18 each has a base unit 18*b* and a supporting column 18*c*, and the supporting columns 18*c* are connected to each other via a shaft 55. Each of the base units 18*b* is fixed on an upper surface 21 of a mobile object 20 such as the roof of an automobile. The shaft 55 connecting the pair of supporting columns 18*c* is rotatable and held inside the upper surface 21 of the mobile object 20 such as the roof of the automobile. A pair of cameras 10 is arranged on end portions of the supporting columns 18*c* (on the end portions 18*a* of the supporting members 18).

The angles of the supporting columns 18*c* of the supporting members 18 are adjusted by rotation of the shaft 55. The shaft 55 may be rotated automatically or manually. Each of the supporting members 18 may also be provided with a mechanism of keeping the orientation of the optical axis 13 of the camera 10 upward from the upper surface 21 after the shaft 55 is rotated or a mechanism of fixing the supporting column 18*c* at a certain angle.

With the supporting members 18 as illustrated an FIGS. 21A to 21C, since the pair of supporting columns 18*c* are connected via the shaft 55, the pair of supporting columns 18*c* is simultaneously adjusted to the same angle. In addition, since the shaft 55 functions in the same way as the above frame 50, misalignment between the positions (angles) of the pair of supporting columns 18*c*, namely, misalignment between the pair of cameras 10 arranged on the end portions of the supporting columns 18*c*, is prevented.

In addition, the heights of the supporting members 18 may be adjusted.

Figure 22A:
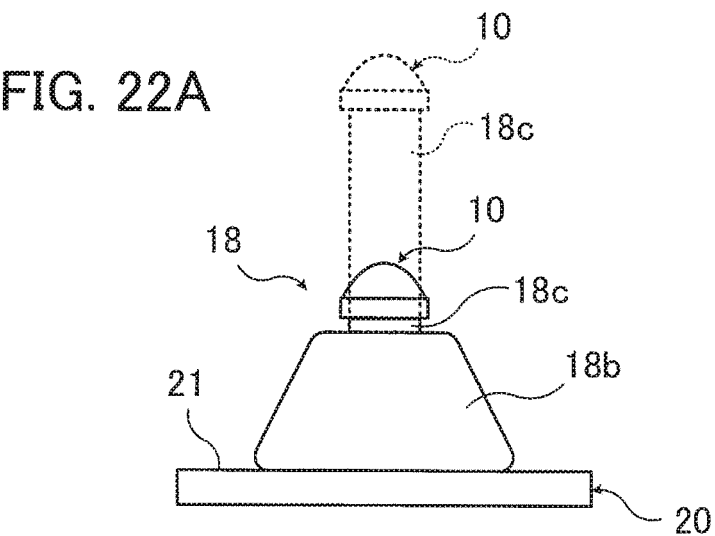
FIGS. 22A and 22B illustrate configuration examples of a height adjustment mechanism of a supporting member according to the fifth embodiment.
Figure 22B:
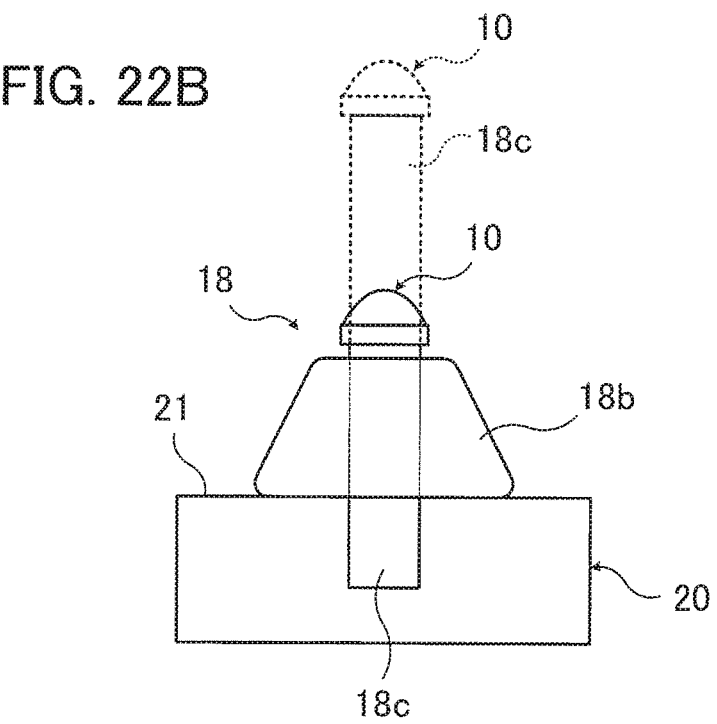

FIGS. 22A and 22B illustrate configuration examples of a height adjustment mechanism of a supporting member according to the fifth embodiment. FIGS. 22A and 22B are schematic side views of main portions of examples of a supporting member according to the fifth embodiment.

For example, as illustrated in FIG. 22A, a supporting member 18 includes a base unit 18*h* and a supporting column 18*c*. The base unit 18*b* is fixed on an upper surface 21 of a mobile object 20 such as the roof of an automobile. The height of the supporting column 18*c* changes as the supporting column 18*c* extends or shortens. In FIG. 22A, the supporting column 18*c* that has been extended is, illustrated by a dotted line, and the supporting column 18*c* that has been shortened is illustrated by a solid line. The supporting column 18*c* may be extended or shortened automatically or manually.

In addition, as illustrated in FIG. 22B, the supporting column 18*c* may be configured to be shortened when the supporting column 18*c* is held inside the mobile object 20 and extended when the supporting column 18*c* is protruded from the mobile object 20. In FIG. 22B, the supporting column 18*c* that has been extended by being protruding from the mobile object 20 is illustrated by a dotted line, and the supporting column 18*c* that has been shortened by being held within the mobile object 20 is illustrated by a solid line. The supporting column 18*c* may be protruded (extended) or housed automatically or manually.

The supporting member 18 having the angle adjustment mechanism as illustrated in any one of FIGS. 20A to 20C and FIGS. 21A to 21C may include the height adjustment mechanism as illustrated in one of FIGS. 22A and 22B.

By allowing the individual supporting members 13 to have the above angle adjustment mechanism or height adjustment mechanism, the cameras 10, etc. arranged on the end portions 18*a* of the supporting members 18 are arranged more freely.

Next, a sixth embodiment will be described.

Figure 23A:
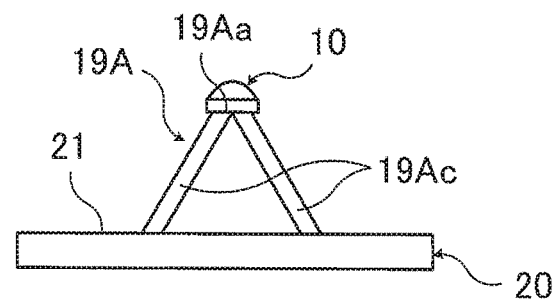
FIGS. 23A to 23D illustrate configuration examples of supporting members according to a sixth embodiment.
Figure 23B:
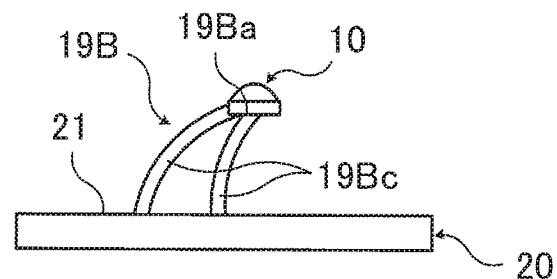
Figure 23C:
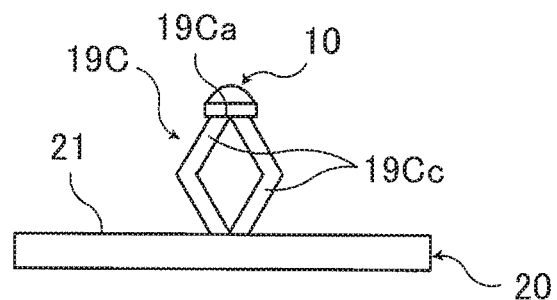
Figure 23D:
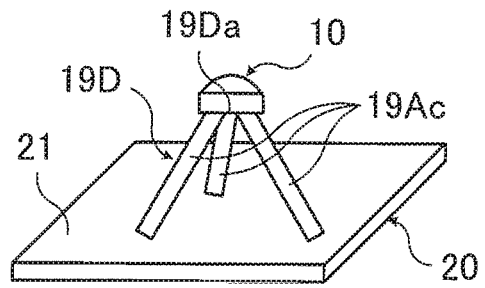

FIGS. 23A to 23D illustrate configuration examples of supporting members according to the sixth embodiment. More specifically, FIGS. 23A to 23C are schematic side views of main portions of examples of supporting members according to the sixth embodiment, and FIG. 23D is a schematic perspective view of a main portion of an example of a supporting member according to the sixth embodiment.

For example, a supporting member 19A illustrated in FIG. 23A is arranged on an upper surface 21 of a mobile object 20 such as the roof of an automobile. The supporting member 19A includes two supporting columns 19A*c*. For example, a camera 10 as illustrated in FIG. 1 is arranged on end portions of these two supporting columns 19A*c* (an end portion 19A*a* of the supporting member 19A). The camera 10 is stably held by the two supporting columns 19A*c*. In addition, since space is created between the two supporting columns 19A*c*, a situation in which an object such as a standing person or obstacle is hidden in an image captured by the camera 10 on the other supporting member 19A not illustrated is created less frequently.

A supporting member 19B illustrated in FIG. 23B is arranged on an upper surface 21 of a mobile object 20 and includes two curved supporting columns 19B*c*. For example, a camera 10 as illustrated in FIG. 1 is arranged on end portions of these two supporting columns 19B*c* (an end portion 19B*a* of the supporting member 19B). The camera 10 is stably held by the two supporting columns 19B*c*. In addition, since the two supporting columns 19B*c* are curved, a situation in which an object such as a standing person or obstacle is hidden in an image captured by the camera 10 on the other supporting member 19B not illustrated is created less frequently.

A supporting member 19C illustrated in FIG. 230 is arranged on an upper surface 21 of a mobile object 20 and includes two bent supporting columns 19C*c*. For example a camera 10 as illustrated in FIG. 1 is arranged on end portions of these two supporting columns 19C*c* (an end portion 19C*a* of the supporting member 19C). The camera 10 is stably held by the two supporting columns 19C*c*. In addition, since the two supporting columns 19C*c* are curved and form a rhombic shape when seen in a side direction, a situation in which an object such as a standing person or obstacle is hidden in an image captured by the camera 10 on the other supporting member 19C not illustrated is created less frequently.

A supporting member 19D illustrated in FIG. 23D is also arranged on an upper surface 21 of a mobile object 20. However, this supporting member 19D differs from the supporting member 19A illustrated in FIG. 23A in that the supporting member 19D includes three supporting columns 19Ac. For example, a camera 10 as illustrated in FIG. 1 is arranged on end portions of these three supporting columns 19Ac (an end portion 19Da of the supporting member 190). The camera 10 is stably held by the three supporting columns 19Ac. Namely, the number of supporting columns 19Ac supporting a camera 10 is not limited to two. Three or more supporting columns 19Ac may be used to support a camera 10.

Likewise, the supporting member 19B illustrated in FIG. 23B may include two or more curved supporting columns 19Bc. The supporting member 19C illustrated in FIG. 23C may also include two or more bent supporting columns 19Cc.

The camera 10a as illustrated in FIG. 2A or the camera 10b as illustrated in FIG. 2B may be arranged on any one of the supporting members 19A to 19D.

Transparent material such as acrylic material may be used for the supporting members 17 described in the above fourth embodiment, the supporting members 18 (the supporting columns 18c and the base units 18b) described in the above fifth embodiment, and the supporting members 19A to 19D described in the above sixth embodiment. By using such material for the supporting members 17, 18, and 19A to 19D, one camera 10 is able to capture an image beyond the corresponding one of the other supporting members 17, 18, and 19A to 19D. Thus, the distance measurement range is widened. In addition, by making the supporting columns 18c of the supporting members 18 and the supporting columns 19Ac, 19Bc, and 19Cc of the supporting members 19A to 19D narrower, for example, than the respective cameras 10, etc. that these supporting columns support, smaller areas are hidden by these supporting columns 18c, 19Ac, 19Bc, and 19Cc. Thus, the distance measurement range is widened.

Next, a seventh embodiment will be described.

Figure 24:
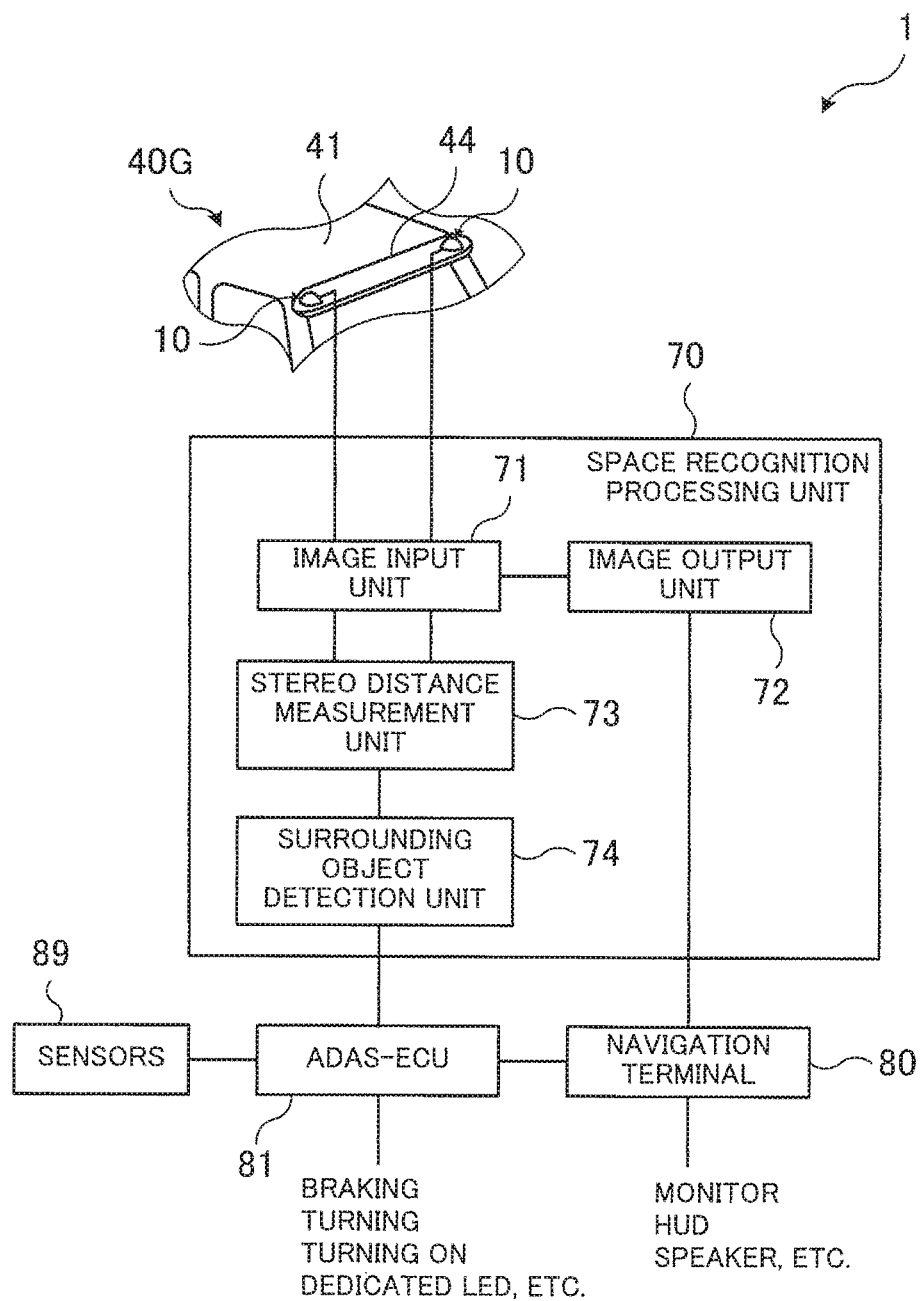
FIG. 24 illustrates an example of a distance measurement system according to a seventh embodiment.
Figure 25:
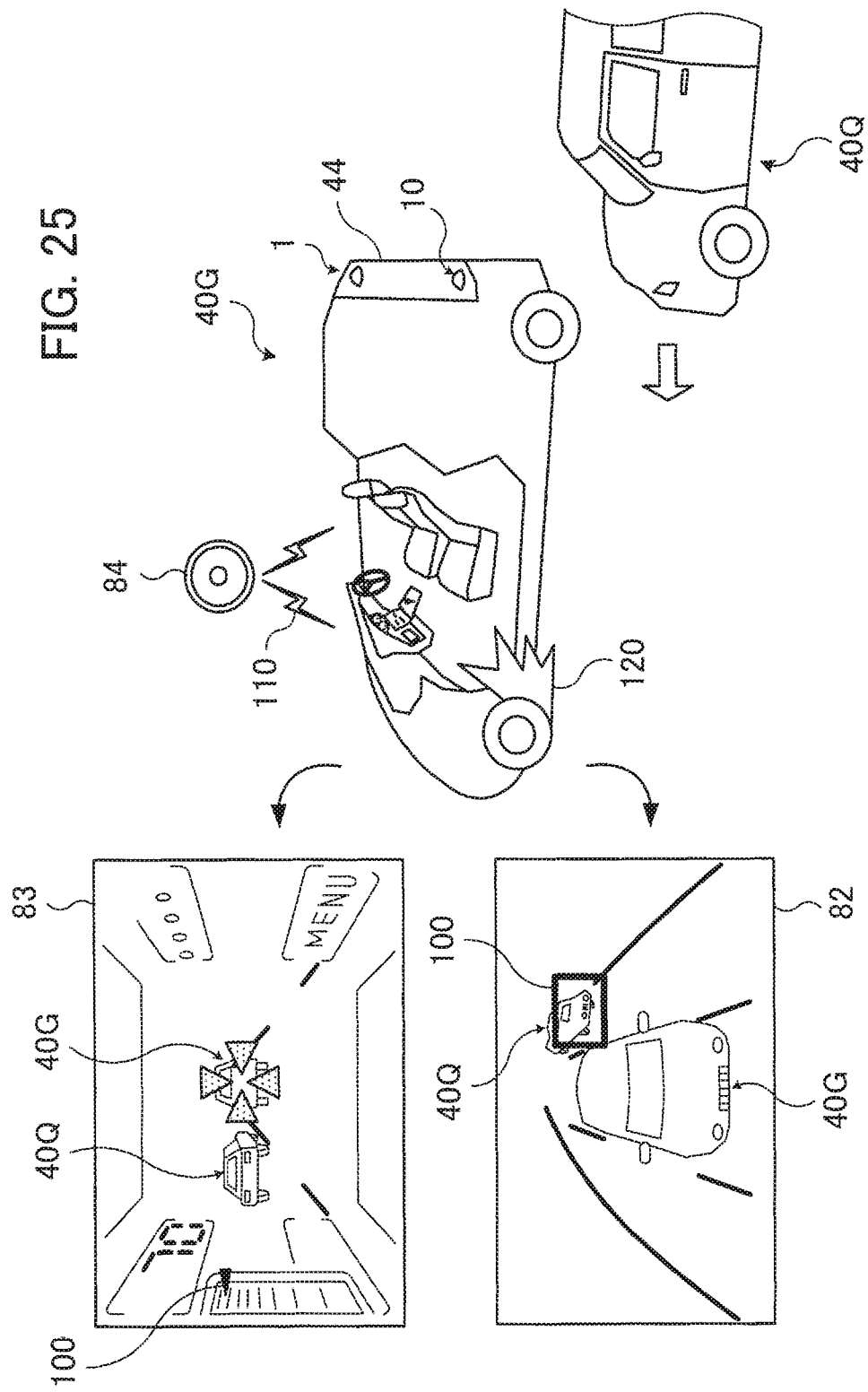
FIG. 25 illustrates an operation of a distance-measurement-system-quipped vehicle according to the seventh embodiment.

FIG. 24 illustrates an example of a distance measurement system according to the seventh embodiment. In addition, FIG. 25 illustrates an operation of a distance-measurement-system-quipped vehicle according to the seventh embodiment.

Hereinafter, an example in which the distance measurement system 1 is arranged on the rear spoiler 44 of the automobile 40G as illustrated in FIG. 9A will be described. As illustrated in FIG. 24 (and FIG. 9A), the distance measurement system 1 includes a pair of cameras 10 arranged on the right and left edge portions 44a of the rear spoiler 44 attached to the roof 41 of the automobile 40G. The optical axes 13 (FIG. 1) of the cameras 10 are oriented upward from the rear spoiler 44.

The distance measurement system 1 further includes a space recognition processing unit 70, as illustrated in FIG. 24. The space recognition processing unit 70 includes an image input unit 71, an image output unit 72, a stereo distance measurement unit 73, and a surrounding object detection unit 74.

The image input unit 71 receives information (image information) about images captured by the pair of right and left cameras 10.

The image output unit 72 outputs image information received from the image input unit 71 to a navigation system terminal (a navigation terminal) 80 mounted on the automobile 40G.

The stereo distance measurement unit 73 uses the information about the two images captured by the pair of cameras 10, the information having been received by the image input unit 71, to calculate the parallax in certain area within the information about the two images. Next, based on the parallax, the stereo distance measurement unit 73 calculates the distance to the certain area.

The surrounding object detection unit 74 uses the information (distance information) about the distance calculated by the stereo distance measurement unit 73, to detect an object such as a person or an obstacle that exists around the automobile 40G. The information (detected object information) about the object detected by the surrounding object detection unit 74 is outputted to an advanced driver assistance system-electronic control unit (ADAS-ECU) 81.

By using the detected object information outputted by the surrounding object detection unit 74, the ADAS-ECU 81 determines whether the automobile 40G is in a hazardous situation. The ADAS-ECU 81 may make this determination by using information supplied by various sensors 89 mounted on the automobile 40G in addition to or instead of the detected object information. Based on a result of the determination, the ADAS-ECU 81 performs braking, turning, turning on or blinking a dedicated light-emitting diode (LED), etc.

In addition, the information (determination result information) indicating the result of the determination made by the ADAS-ECU 81 is outputted to the navigation terminal 80. The navigation terminal 80 superimposes the determination result information on information displayed on a monitor 82 or a head-up display (HUD) 83 in FIG. 25 and outputs the result of the superimposition processing to the monitor 82 or the HUD 83 as a mapping or notifies the driver of the result as a sound via a speaker 84.

FIG. 25 illustrates an example in which an automobile 40Q is approaching the automobile 40G from the left rear direction of the automobile 40G.

The detected object information outputted by the surrounding object detection unit 74 includes information about the approaching automobile 40Q from the left rear direction. For example, the navigation terminal 80 uses the determination result information based on the detected object information and obtained from the ADAS-ECU 81 and displays information 100 such as a marking on the monitor 82 or the HUD 83 about the approaching automobile 40Q from the left rear direction. In addition, for example, when the ADAS-ECU 81 detects that the driver has turned on a left blinker on the basis of information about a sensor 89 for detecting turning on of the blinker, the ADAS-ECU 81 turns on an alarm 110 from the speaker 84. In addition, for example, when the ADAS-ECU 81 detects that the driver has started to turn left on the basis of information about a sensor 89 for detecting the steering angle of the steering wheel, the ADAS-ECU 81 performs a risk avoidance support operation. For example, the ADAS-ECU 81 encourages the driver to remain in the current lane by generating appropriate steering torque or performs a braking operation 120 using brakes.

Processing functions of the space recognition processing unit 70, the ADAS-ECU 81, and the navigation terminal 80 in the distance measurement system 1 may be realized by using a computer controlled by at least one processor.

FIGS. 26 to 31 illustrate configuration examples of the distance measurement systems 1 and 1B according to the seventh embodiment and vehicles (automobiles) equipped with the distance measurement system 1.

Figure 26:
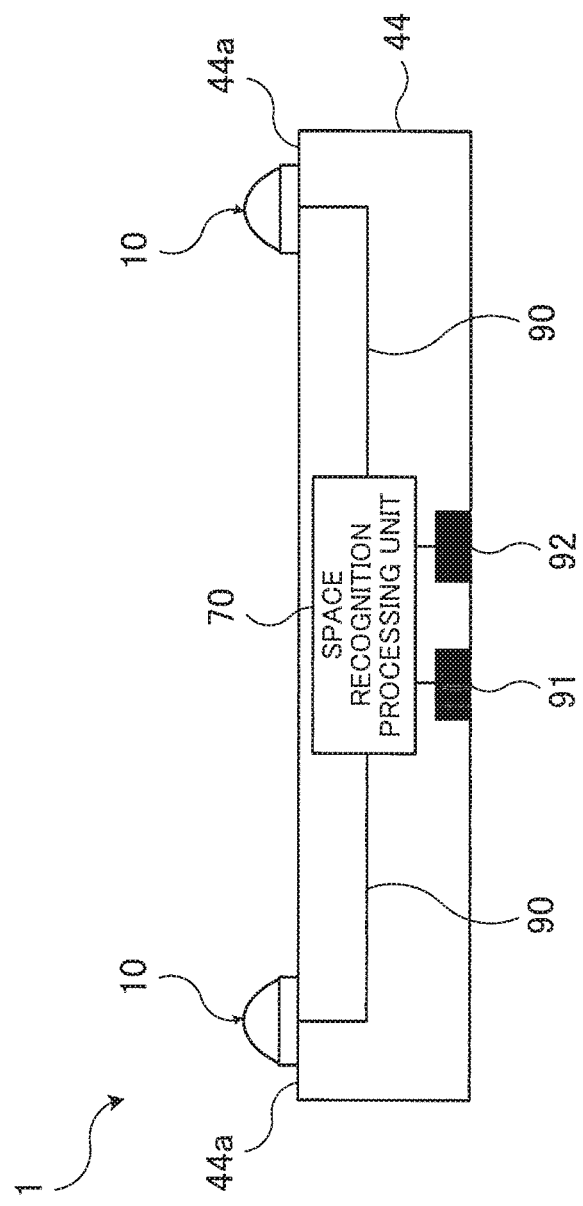
FIG. 26 illustrates first configuration example of the distance measurement system according to the seventh embodiment.

FIG. 26 illustrates a first configuration example of the distance measurement system according to the seventh embodiment.

The distance measurement system 1 illustrated in FIG. 26 includes a pair of cameras 10 on right and left edge portions 44a of a rear spoiler 44 and the above space recognition processing unit 70 inside the rear spoiler 44. Each of the cameras 10 is connected to the space recognition processing unit 70 via a wiring 90. The rear spoiler 44 includes, for example, a power supply terminal 91 for supplying power to the space recognition processing unit 70 and an information terminal 92 for outputting information to the navigation terminal 80 and the ADAS-ECU 81 from the space recognition processing unit 70.

Figure 27:
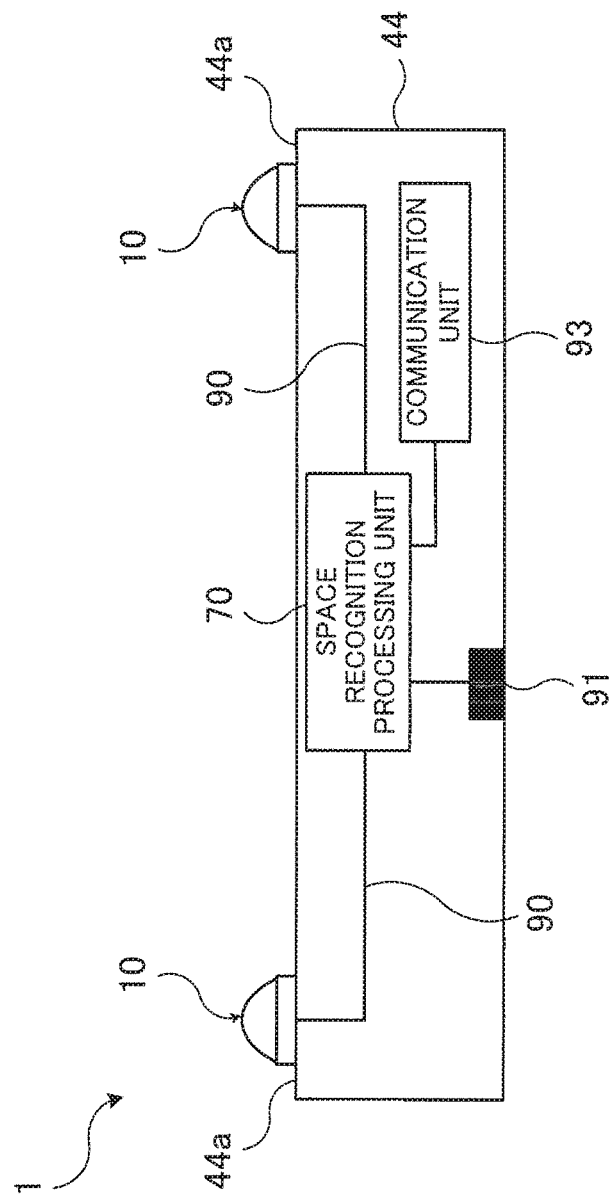
FIG. 27 illustrates a second configuration example of the distance measurement system according to the seventh embodiment.

FIG. 27 illustrates a second configuration example of the distance measurement system according to the seventh embodiment.

While FIG. 26 illustrates an example in which the rear spoiler 44 includes the information terminal 92, the rear spoiler 44 may be configured to include a communication unit 93 that performs wireless communication and output information to the navigation terminal 80 and the ADAS-ECU 81 from the space recognition processing unit 70 via the communication unit 93, as illustrated in FIG. 27.

Figure 28:
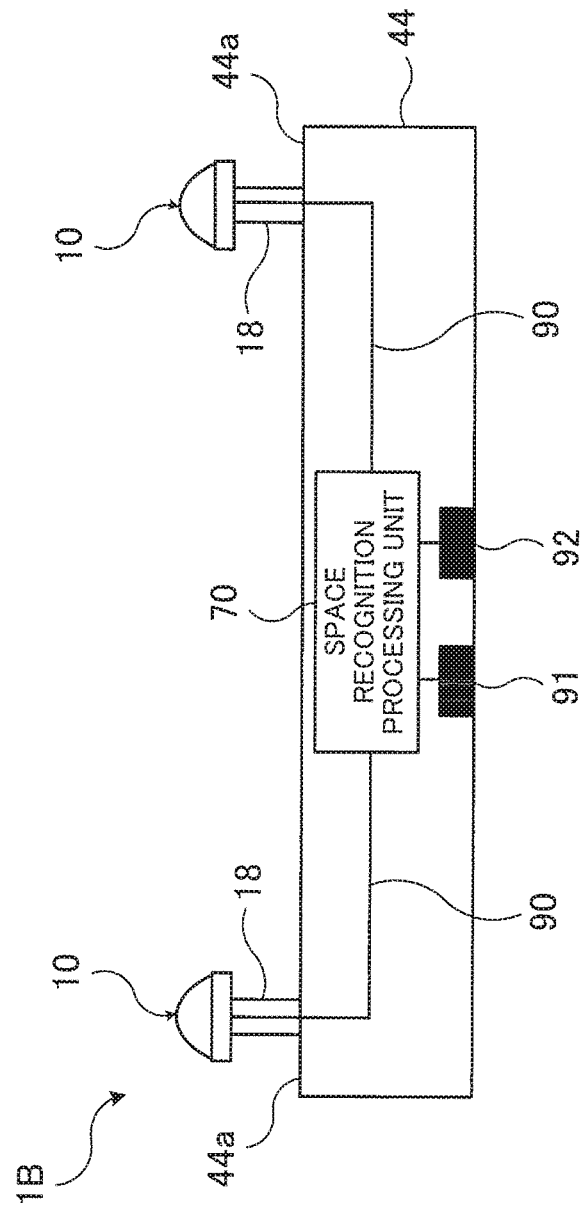
FIG. 28 illustrates a third configuration example of the distance measurement system according to the seventh embodiment.

FIG. 28 illustrates a third configuration example of the distance measurement system according to the seventh embodiment.

FIG. 28 illustrates an example of the distance measurement system 1B including a pair of cameras 10 held at a predetermined height from an upper surface of a rear spoiler 44, for example, by the supporting members 18 as described in the above fifth embodiment. Since the cameras 10 are attached at higher positions by the supporting members 18, the cameras 10 are able to capture a wider image around the automobile 40G. Thus, since a smaller area is hidden by the roof 41, the distance measurement range is expanded.

While FIG. 28 illustrates an example in which a pair of cameras 10 is supported by a pair of supporting members 18, an individual camera 10 may be supported by any of the supporting members 17 as described in the above fourth embodiment or the supporting members 19A to 19D as described in the above sixth embodiment. In any of these cases, similar advantages to those described above are obtained. In addition, as described above, by using transparent material for the supporting members 18, 17, and 19A to 19D, is possible to widen the distance measurement range. In addition, it is possible to obtain similar advantages to those described above by using transparent material for the rear spoiler 44.

Figure 29:
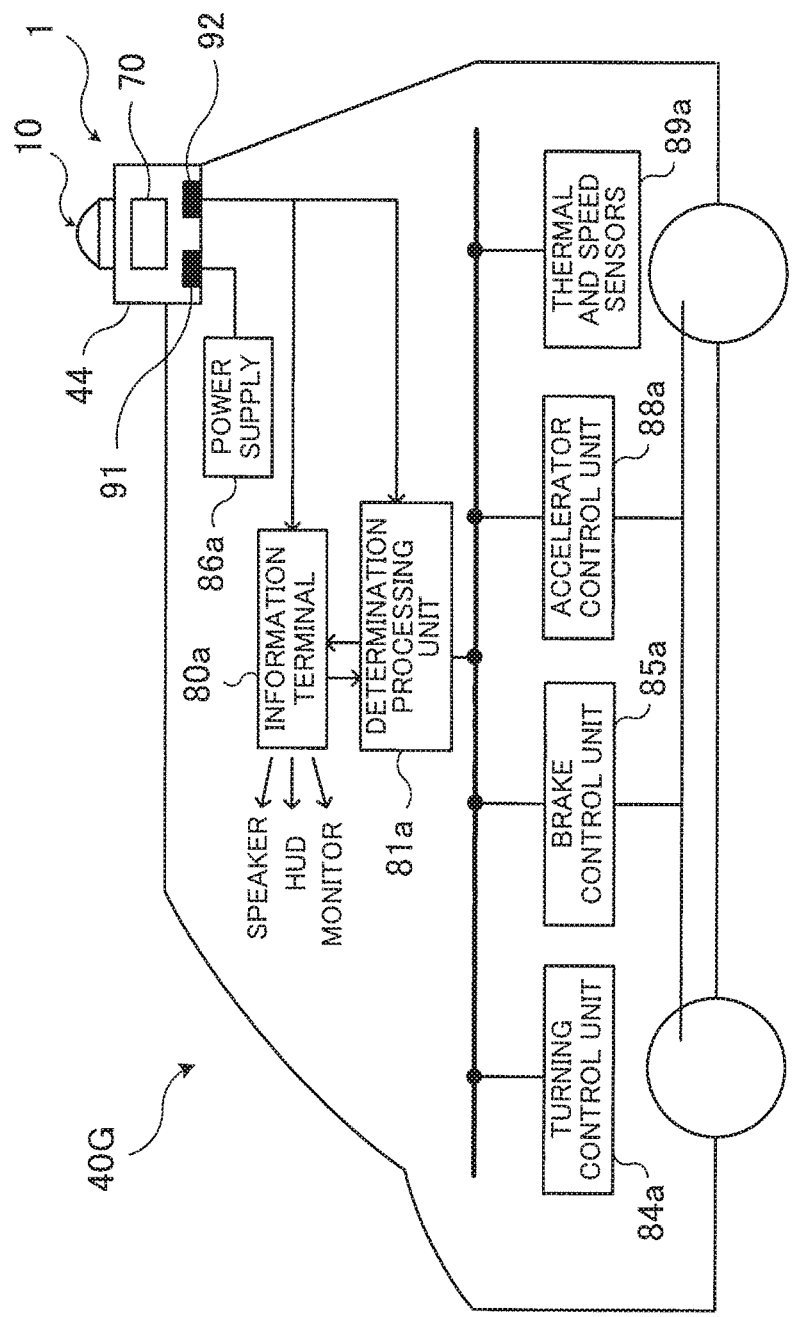
FIG. 29 illustrates a first configuration example of the distance-measurement-system-quipped vehicle according to the seventh embodiment.

FIG. 29 illustrates a first configuration example of the distance-measurement-system-quipped vehicle according to the seventh embodiment.

FIG. 29 illustrates an example of the automobile 40G including the distance measurement system 1 and the rear spoiler 44 illustrated in FIG. 26. The automobile 40G further includes an information terminal 80a, a determination processing unit 81a, a turning control unit 84a, a brake control unit 85a, an accelerator control unit 88a, thermal and speed sensors 89a, and a power supply 86a.

The space recognition processing unit 70 in the distance measurement system 1 is connected to the power supply 86a via the power supply terminal 91. The space recognition processing unit 70 is connected to the information terminal 80a, the determination processing unit 81a, etc. via the information terminal 92.

For example, a navigation terminal having display unit is used as the information terminal 80a. Other than a navigation terminal, examples of the information terminal 80a include a smartphone, a tablet terminal, a personal computer, an event data recorder, and any combination of these components. For example, an ADAS-ECU is used as the determination processing unit 81a. Other than an ADAS-ECU, examples of the determination processing unit 81a include various kinds of processor such as a microcontroller.

The automobile 40G including an event data recorder as the information terminal 80a records various kinds of information (image information, distance information, detected object information, etc.) generated by the space recognition processing unit 70 in the distance measurement system 1 in the event data recorder. In this way, for example, the automobile 40G is able to acquire and record an image indicating how the automobile 40G has come into contact with a surrounding object such as a person or an obstacle. Since the automobile 40G performs distance measurement, the automobile 40G is able to record the moving speed of the object when the object and the automobile 40G have come into contact with each other. Thus, reliable information as evidence is obtained.

The determination processing unit 81a uses the detected object information, etc. outputted from the space recognition processing unit 70 and the information, etc. outputted from the thermal and speed sensors 89a, to perform processing for determining whether the automobile 40G is in a hazardous situation. Based on a result of the determination, the information terminal 80a displays various kinds of information on a display unit such as a HUD. In addition, the determination processing unit 81a performs processing for generating an alarm from a speaker or the like, processing for controlling the brake control unit 85a so that the automobile 40G puts on the brakes, processing for controlling the steering by using the turning control unit 84a so that the automobile 40G remains in or changes the current lane, and processing for controlling the acceleration by using the accelerator control unit 88a so that the automobile 40G slows down or speeds up.

The determination processing unit 81a that performs the processing described above may be incorporated in the rear spoiler 44.

Figure 30:
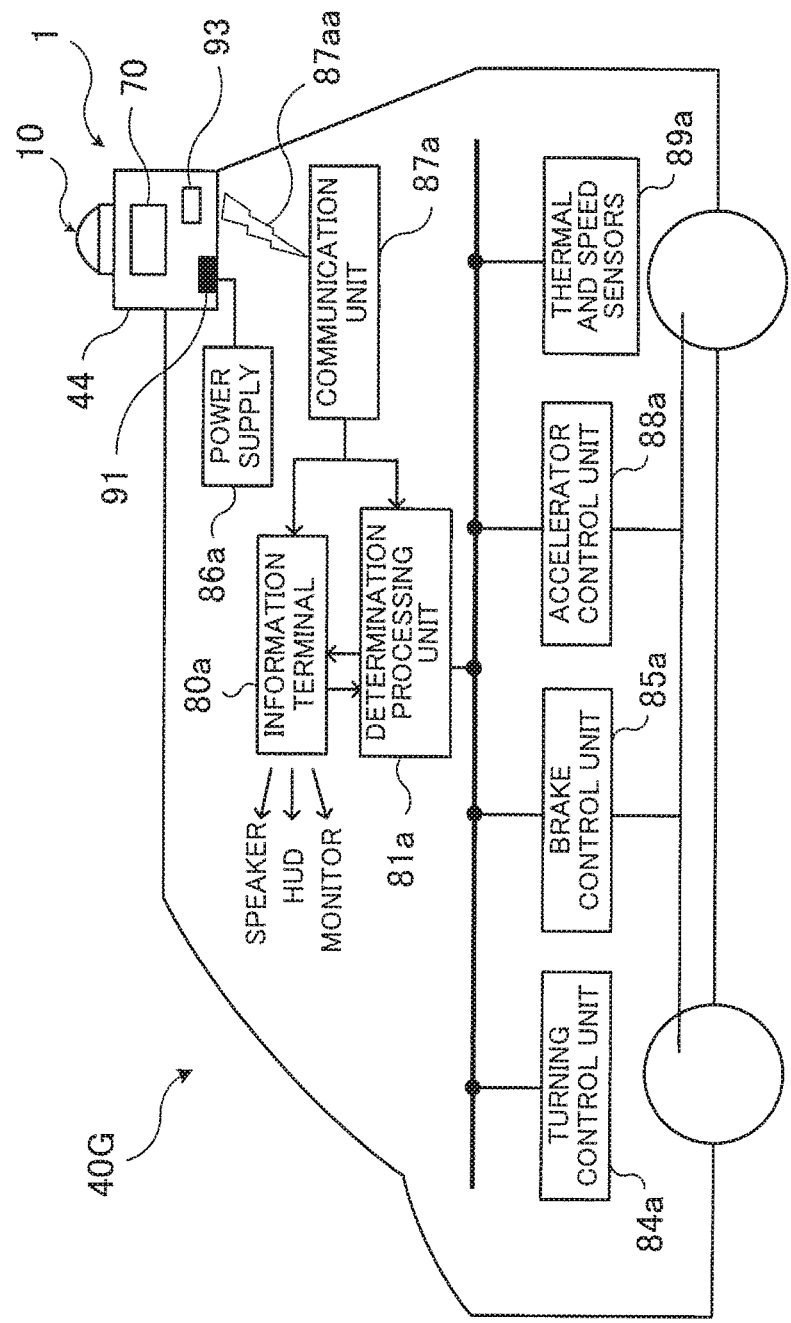
FIG. 30 illustrates a second configuration example of the distance-measurement-system-quipped vehicle according to the seventh embodiment.

FIG. 30 illustrates a second configuration example of the distance-measurement-system-equipped vehicle according to the seventh embodiment.

FIG. 30 illustrates an example of the automobile 40G including the distance measurement system 1 and the rear spoiler 44 illustrated in FIG. 27. The automobile 40G includes a communication unit 87a that performs wireless communication 87aa with the communication unit 93 included in the rear spoiler 44. The second configuration example illustrated in FIG. 30 differs from the first configuration example illustrated in FIG. 29 in that the automobile 40G uses this wireless communication unit.

In the seventh embodiment, if the automobile 40G has a hatchback door on its rear side, the rear spoiler 44 may be arranged on an upper edge portion of the hatchback door. In addition, as in the above embodiments, a pair of cameras 10a or 10b as illustrated in FIG. 2A or 2B may be used instead of a pair of cameras 10. In addition, a pair of supporting members for supporting the pair of cameras 10, etc. may be arranged, and the supporting members may have a shape illustrated in any one of FIGS. 15 to 23D.

While FIGS. 29 and 30 illustrate an example of the automobile 40G having the rear spoiler 44 on which a pair of cameras 10 in the distance measurement system 1 are arranged, the pair of cameras 10 may be arranged on a roof 41 of a vehicle. This configuration as a third configuration example will be described with reference to FIG. 31.

Figure 31:
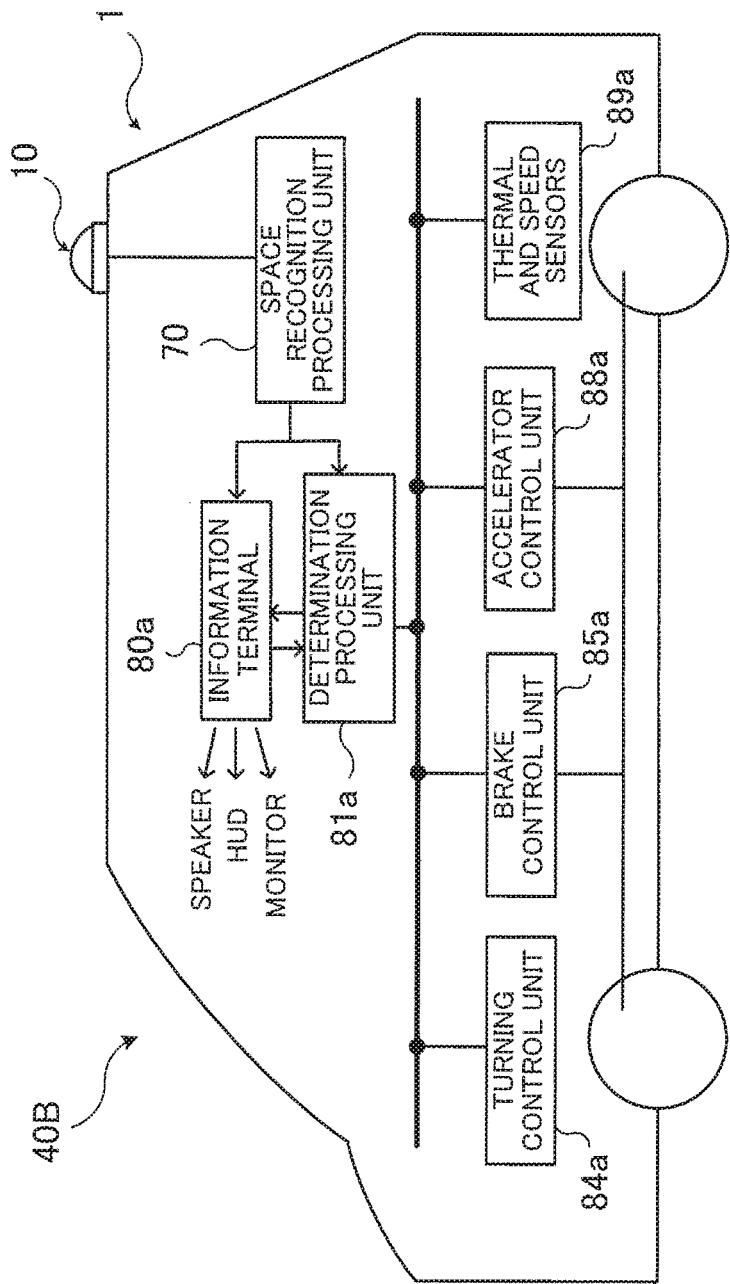
FIG. 31 illustrates a third configuration example of the distance-measurement-system-quipped vehicle according to the seventh embodiment.

FIG. 31 illustrates a third configuration example of the distance-measurement-system-quipped vehicle according to the seventh embodiment.

More specifically, FIG. 31 illustrates an example of the automobile 40B in FIG. 7B including a pair of cameras 10 on the rear-side edge portions 41b of the roof 41. As illustrated in FIG. 31, in the automobile 40B according to the third configuration example, the space recognition processing unit 70 in the distance measurement system 1 is connected to the information terminal 80a, the determination processing unit 81a, etc. In other aspects, the automobile 40B is configured in the same way as the automobile 40G according to the first configuration example illustrated in FIG. 29.

This automobile 40B according to the third configuration example may also include the communication unit 93 that outputs information from the space recognition processing unit 70 and the communication unit 87a that performs wireless communication 87aa with the communication unit 93, as in the example in FIG. 30.

While FIG. 31 illustrates an example in which a pair of cameras 10 is arranged on the rear side of the roof 41, the positions of the cameras 10 arranged on the roof 41 may be any positions illustrated in one of FIGS. 7A, 7C, and 8A to 8C. Alternatively, as described in the above second embodiment, a pair of cameras 10 may be arranged diagonally on the roof 41 of the automobile. Still alternatively, if the automobile has a hatchback door on its rear side, a pair of cameras 10 may be arranged on an upper edge portion of the hatchback door. Still alternatively, a pair of cameras 10 may be arranged on the roof rails 46 as illustrated in any one of FIGS. 11A to 11C. Still alternatively, a pair of cameras 10 may be arranged on the roof carrier 47 illustrated in FIG. 12. Still alternatively, a pairs of cameras 10a or 10b as illustrated in FIG. 2A or 2B may be used instead of a pair of cameras 10. In addition, an individual camera 10, etc. may be supported by, for example, any one of the supporting members 17, 18, and 19A to 19D as illustrated in FIGS. 15 to 23D.

Next, an eighth embodiment will be described.

Figure 32:
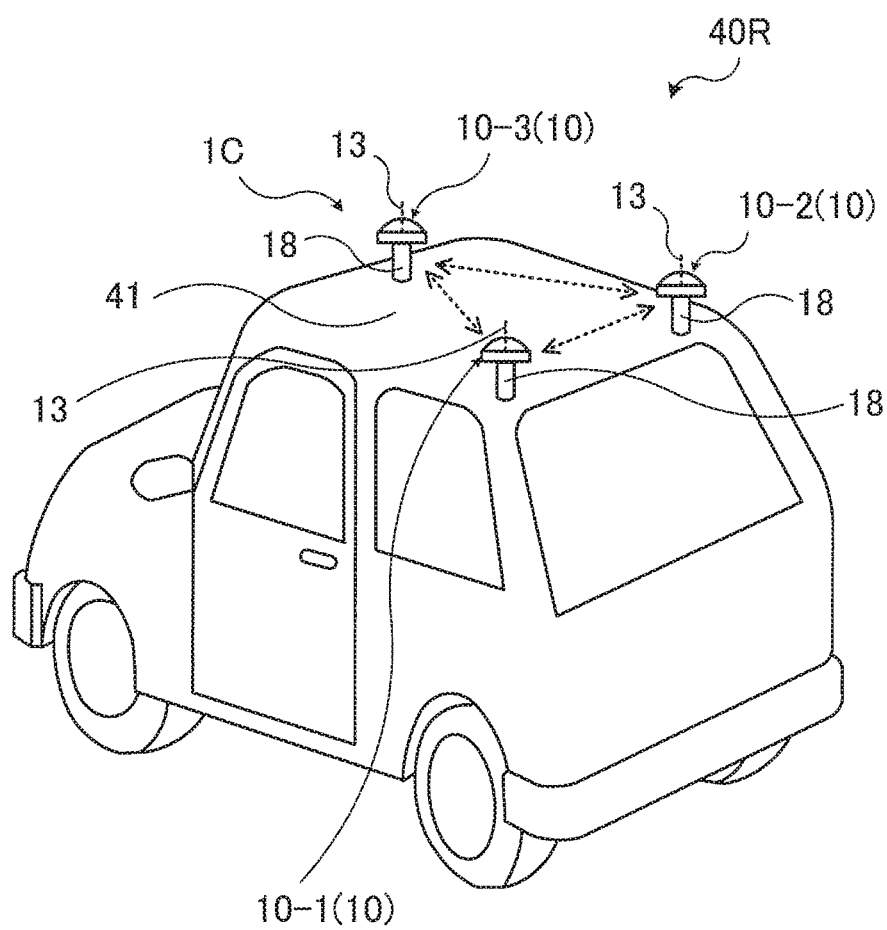
FIG. 32 illustrates a first configuration example of a distance-measurement-system-quipped vehicle according to an eighth embodiment.

FIG. 32 illustrates a first configuration example of a distance-measurement-system-quipped vehicle according to the eighth embodiment. More specifically, FIG. 32 is a schematic perspective view of a main portion of a first configuration example of a distance-measurement-system-equipped vehicle according to the eighth embodiment.

A vehicle (an automobile) 40R illustrated in FIG. 32 includes a roof 41 and a distance measurement system 1C including, for example, cameras 10 (10-1 to 10-3) supported by the supporting members 18 as described in the above fifth embodiment. These cameras are arranged on three portions on the roof 41. The cameras 10-1 to 10-3 are supported by the three respective supporting members 18 in such a manner that the optical axes 13 are oriented upward from the roof 41.

In the distance measurement system 1C, the parallax between images captured by the cameras 10-1 and 10-2 is calculated, and the parallax between images captured by the cameras 10-1 and 10-3 is calculated. In addition, the parallax between images captured by the cameras 10-2 and 10-3 is calculated. FIG. 32 schematically illustrates the combination of cameras 10 for calculating the parallaxes in dotted arrows. By using these parallaxes, for example, information about the distances to various objects that exist around the automobile 40R is acquired.

For example, there are cases in which images captured by a certain pair of cameras 10 (for example, the cameras 10-1 and 10-2) have a small parallactic angle. In such cases, an area where the parallax, measurement errors, variations, etc. are not accurately obtained could be generated. However, in the distance measurement system 1C, one pair of cameras covers about one third of the region around the automobile 40R. Thus, another pair of cameras (for example, the cameras 10-3 and 10-1 or the cameras 10-3 and 10-2) makes up for the above area. Namely, the parallax, measurement errors, variations, etc. are accurately obtained. In this way, information about various objects that exist around the automobile 40R is acquired accurately. In addition, when one pair of cameras 10 (for example, the cameras 10-1 and 10-2) and another pair of cameras (for example, the cameras 10-3 and 10-1 or the cameras 10-3 and 10-2) capture an identical object, these pairs of cameras are able to obtain two different distance measurement results, more specifically, two different parallaxes in perspective. Thus, it is possible to measure the distance to the object more accurately by using these different results. In addition, as the measurable distance from the automobile 40R extends, the accuracy of measuring the measurement errors and variations is improved. In addition, it is possible to perform the distance measurement in all directions with a field of view not blocked by the roof 41 and the cameras 10.

Figure 33:
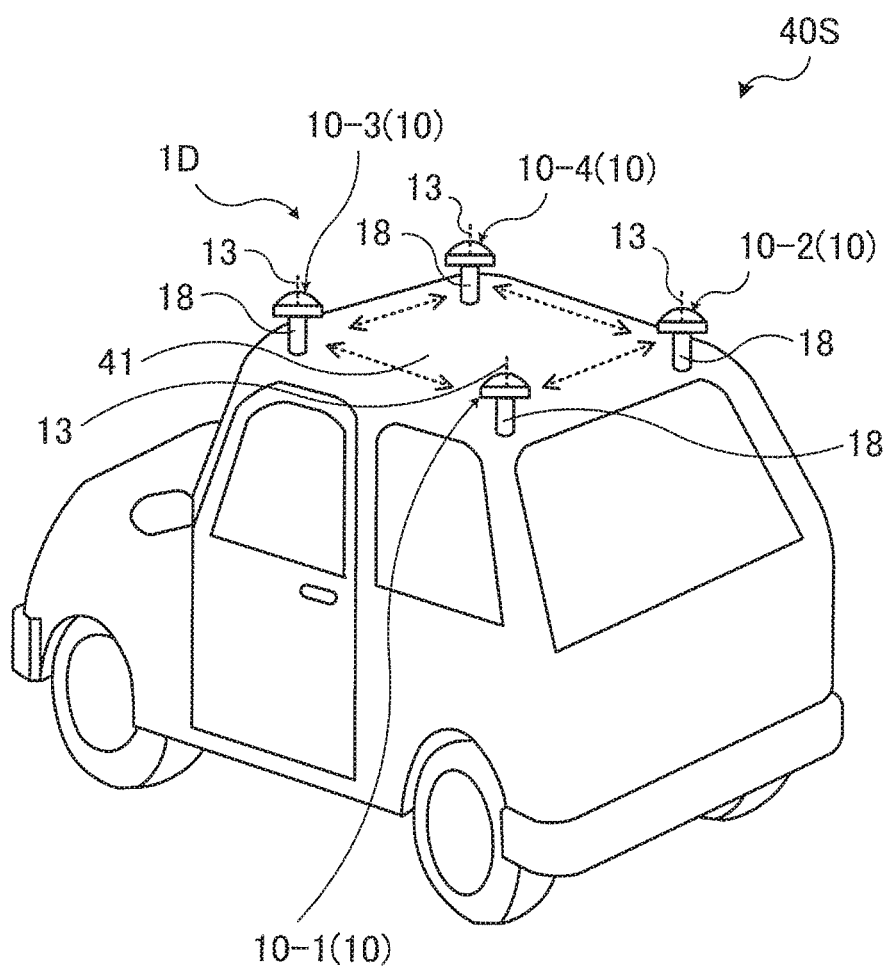
FIG. 33 illustrates a second configuration example of the distance-measurement-system-quipped vehicle according to the eighth embodiment.

FIG. 33 illustrates a second configuration example of the distance-measurement-system-quipped vehicle according to the eighth embodiment. More specifically, FIG. 33 is a schematic perspective view of a main portion of a second configuration example of a distance-measurement-system-quipped vehicle according to the eighth embodiment.

A vehicle (an automobile) 40S illustrated in FIG. 33 includes a roof 41 and a distance measurement system 1D including, for example, cameras 10 (10-1 to 10-4) supported by the supporting members 18 as described in the above fifth embodiment. These cameras are arranged at four corners on the roof 41. The cameras 10-1 to 10-4 are supported by the four respective supporting members 18 in such a manner that the optical axes 13 are oriented upward from the roof 41.

In the distance measurement system 1D, the parallax between images captured by the cameras 10-1 and 10-2 is calculated, and the parallax between images captured by the cameras 10-1 and 10-3 is calculated. In addition, the parallax between images captured by the cameras 10-2 and 10-4 is calculated, and the parallax between images captured by the cameras 10-3 and 10-4. In addition, an individual pair of cameras 10 covers about one fourth of the region around the automobile 40S, to calculate the parallax about various objects. FIG. 33 schematically illustrates the combination of cameras 10 for calculating the parallaxes in dotted arrows. By using these parallaxes, for example, information about the distances to various objects that exist around the automobile 40S is acquired.

In this distance measurement system 1D, as in the above distance measurement system 1C, the parallax, measurement errors, variations, are accurately obtained, and consequently, information about various objects that exist around the automobile 40S is accurately acquired. In addition, as the measurable distance from the automobile 40S extends, the accuracy of measuring the measurement errors and variations is improved. In addition, it is possible to perform the distance measurement in all directions with a field of view not blocked by the roof 41 and the cameras 10.

While in FIGS. 32 and 33 illustrate an example in which the cameras 10 are used, cameras 10a or 10b as illustrated in FIG. 2A or 2B may alternatively be used. In addition, an individual camera 10, etc. may be supported by, for example, any one of the supporting members 17, 18, and 19A to 19D. Still alternatively, the cameras 10, etc. may directly be arranged on the roof 41, without using the supporting members 18. Still alternatively, at least a part of an individual camera 10, etc. may be arranged on a component (a rear spoiler 44, etc.) attached to the roof 41.

The distance measurement system 1, etc. described above is applicable to various mobile objects other than vehicles. Next, examples of other mobile objects to which the distance measurement system 1, etc. (herein, the distance measurement system 1 (FIG. 1) as an example) is applicable will be described.

Figure 34A:
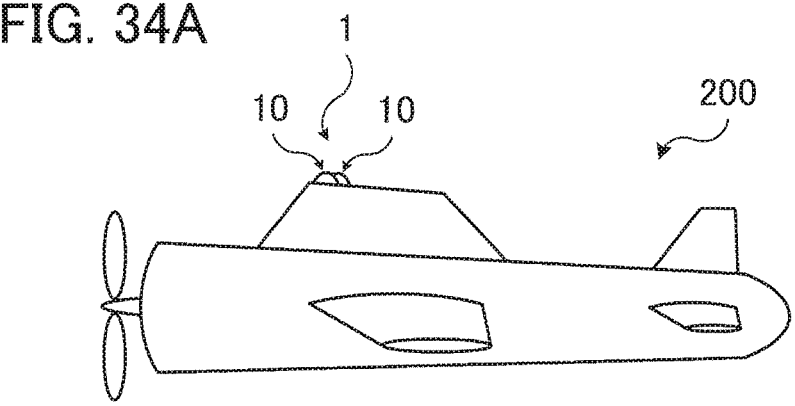
FIGS. 34A and 34B illustrate first application examples.
Figure 34B:
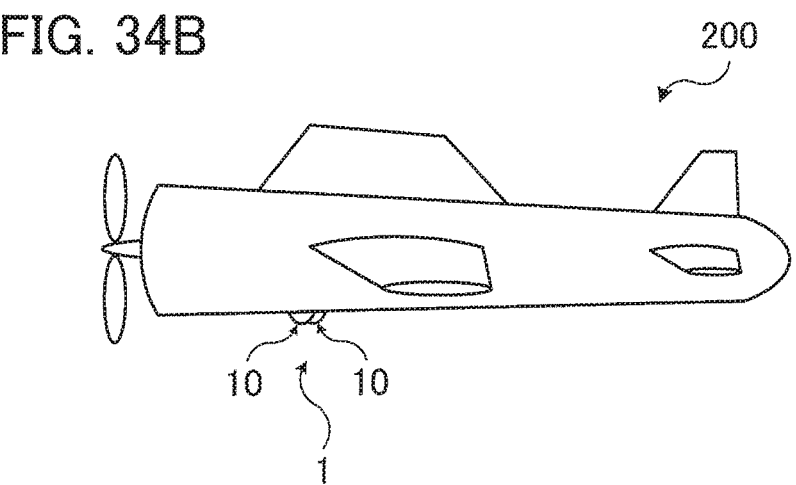

FIGS. 34A and 34B illustrate first application examples.

More specifically, FIGS. 34A and 34B are schematic side views of main portions of examples in which the distance measurement system 1 is applied to an airplane 200 (a mobile object). As illustrated in FIG. 34A, a pair of cameras 10 in the distance measurement system 1 is arranged on an upper surface (for example, on an upper surface of an upper part) of the airplane 200. In this way, the distance measurement in all directions in the upper direction of the airplane 200 is performed. Alternatively, as illustrated in FIG. 34B, a pair of cameras 10 in the distance measurement system 1 may be arranged on a lower surface of the airplane 200. In this way, the distance measurement in all directions in the lower direction of the airplane 200 is performed. Alternatively, by arranging a pair of cameras 10 in the distance measurement system 1 on each of the upper and lower surfaces of the airplane 200, it is possible to perform distance measurement in all directions in both the upper and lower directions of the airplane 200. The distance measurement system 1 may be applied in the same way to various kinds of flying object such as helicopters and drones in accordance with the examples in FIGS. 34A and 34B.

Figure 35A:
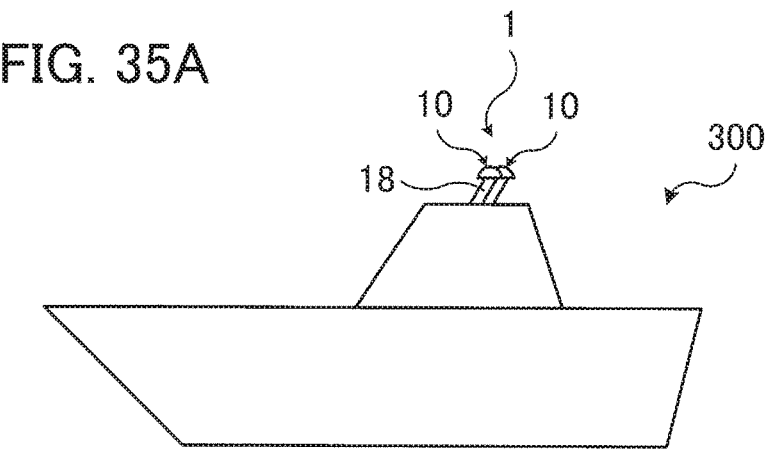
FIGS. 35A and 35B illustrate second application examples.
Figure 35B:
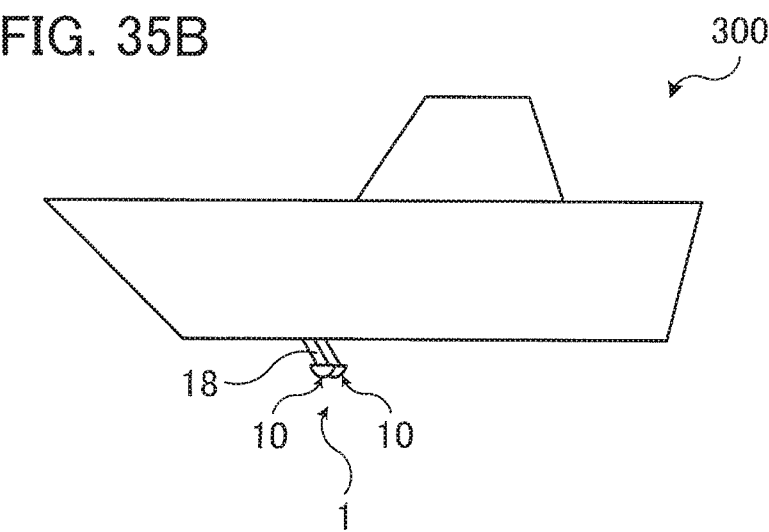

FIGS. 35A and 35B illustrate second application examples.

More specifically, FIGS. 35A and 35B are schematic side views of main portions of examples in which the distance measurement system 1 is applied to a ship 300 (a mobile object). As illustrated in FIG. 35A, a pair of cameras 10 in the distance measurement system 1 is arranged on an upper surface (for example, on an upper surface of an upper part) of the ship 300. FIGS. 35A and 35B illustrate an example in which a pair of cameras 10 is supported by a pair of supporting members 18. In this way, the distance measurement in all directions from the ship 300 is performed. Alternatively, as illustrated in FIG. 35B, by arranging a pair of cameras 10 in the distance measurement system 1 on the bottom of the ship 300, the distances to various objects in the water may be measured. The distance measurement system 1 is applicable to not only cases in which the distances to objects that move on the water such as the ship 300 are measured but also cases in which the distances to objects that move in the water are measured.

Figure 36:
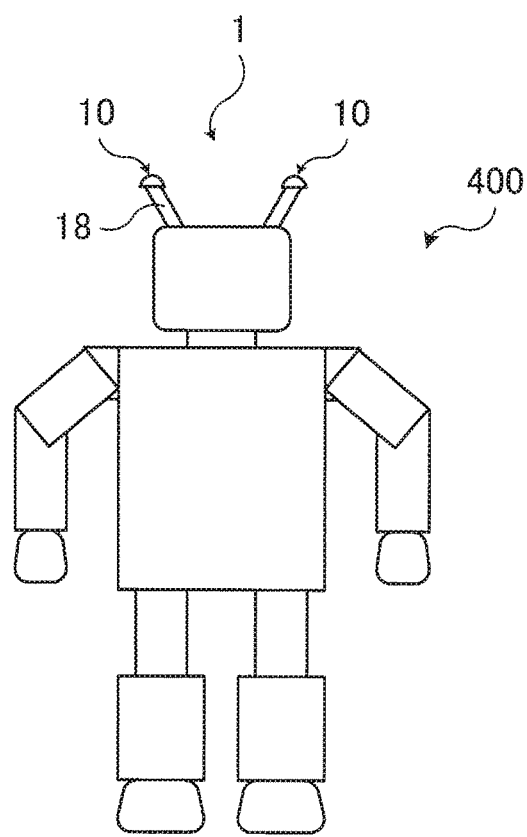
FIG. 36 illustrates a third application example.

FIG. 36 illustrate a third application example.

More specifically, FIG. 36 is a schematic front view of a main portion of an example in which the distance measurement system 1 is applied to a robot 400 (a mobile object). As illustrated in FIG. 36, a pair of cameras 10 in the distance measurement system 1 is arranged on upper surfaces (for example, on upper surfaces of upper parts) of the robot 400.

FIG. 36 illustrates an example in which a pair of cameras 10 is supported by a pair of supporting members 18. In this way, the distance measurement is performed in all directions from the robot 400. Alternatively, the distance measurement system 1 is applicable in the same way not only to humanoid robots but also to various robots such as home robots such as robot cleaners, industrial robots, and search robots.

Figure 37:
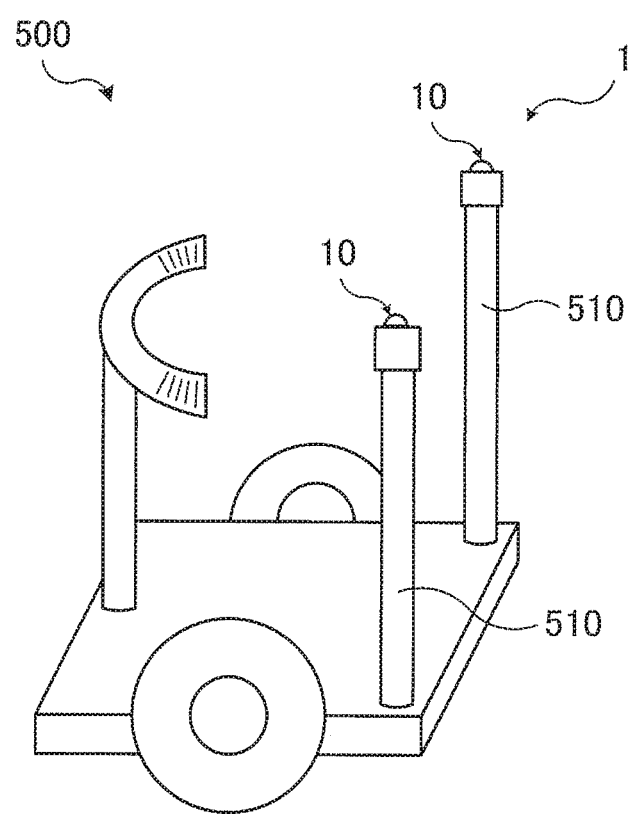
FIG. 37 illustrates a fourth application example.

FIG. 37 illustrate a fourth application example.

More specifically, FIG. 37 is a schematic side view of a main portion of an example in which the distance measurement system 1 is applied to a personal mobility 500 (a mobile object). As illustrated in FIG. 37, a pair of cameras 10 in the distance measurement system 1 is arranged on upper surfaces of upper parts of the personal mobility 500, for example, on upper surfaces of supporting pillars 510. In this way, the distance measurement is performed in all directions from the personal mobility 500.

According to an individual embodiment discussed above, a distance measurement system in which a pair of cameras performs the distance measurement in all directions from a mobile object is realized. In addition, a mobile object and a mobile-object-mountable component that are equipped with this distance measurement system are realized.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:
1. A distance measurement system comprising:
a first camera which is arranged at a first portion that is located on an upper surface of a roof of a mobile object on which the distance measurement system is arranged, located on an upper surface of an upper edge portion of a door of the mobile object, or located on an upper surface of a component arranged on the roof or the upper edge portion, which is located above the upper surface, which includes a first optical axis oriented upward from the upper surface, and which has a field of view in all directions around the first optical axis;
a second camera which is arranged at a second portion different from the first portion located on the upper surface, which is located above the upper surface, which includes a second optical axis oriented upward from the upper surface, and which has a field of view in all directions around the second optical axis; and
a first supporting member and a second supporting member, each supporting member protruding from the upper surface, wherein
a first end portion of the first supporting member is located diagonally upward from a first part of the first supporting member that contacts the upper surface, the first end portion being located diagonally upward along a direction that the first supporting member protrudes,
a first end portion of the second supporting member is located diagonally upward from a first part of the first supporting member that contacts the upper sur- face, the first end portion being located diagonally upward along a direction that the second supporting member protrudes, the first camera and the second camera are arranged over the first end portion of the first supporting member and the first end portion of the second supporting member, respectively, a first space is located between the first camera and the upper surface, a second space is located between the second camera and the upper surface, a distance measurement is performed based on parallax between a first image acquired by the first camera and a second image acquired by the second camera, the first image includes an image of the second space, and the second image includes an image of the first space.

2. The distance measurement system according to claim 1, wherein the first and second cameras include first and second lenses, respectively, located above the upper surface.

3. The distance measurement system according to claim 1, wherein the mobile object is a vehicle.

4. The distance measurement system according to claim 1, wherein the first and second cameras are arranged on front and rearsides of the mobile object, respectively, in a forward direction of the mobile object.

5. The distance measurement system according to claim 1, wherein the first and the second cameras are arranged on right and left sides of the mobile object, respectively, with respect to a forward direction of the mobile object.

6. The distance measurement system according to claim 1, further comprising a connection member connecting the first and second cameras and held inside the upper surface.

7. The distance measurement system according to claim 1, further comprising a third camera which is arranged at a third portion that is located on the upper surface, wherein the third portion is different from the first and second portions located on the upper surface, and the third portion includes a third optical axis oriented upward from the upper surface, and has a field of view in all directions around the third optical axis.

8. The distance measurement system according to claim 7, wherein distance measurement in all directions is performed based on first parallax between the first image acquired by the first camera and the second image acquired by the second camera, second parallax between the second image and a third image acquired by the third camera, and third parallax between the third image and the first image.

9. The distance measurement system according to claim 7, further comprising a third supporting member, wherein third camera is held above the upper surface by the third supporting member.

10. The distance measurement system according to claim 1, wherein each of the first and second supporting members has a shark-fin-like shape.

11. The distance measurement system according to claim 1, wherein each of the first and second supporting members has a columnar shape.

12. The distance measurement system according to claim 11, wherein an angle of each first and second supporting member with respect to the upper surface is adjustable.

13. The distance measurement system according to claim 11, wherein a height of said each first and second supporting member from the upper surface is adjustable.

14. A mobile object comprising:
a roof;
a door;

a first camera which is arranged at a first portion that is located on an upper surface of the roof or located on an upper surface of an upper edge portion of the door, which is located above the upper surface, which includes a first optical axis oriented upward from the upper surface, and which has a field of view in all directions around the first optical axis;

a second camera which is arranged at a second portion different from the first portion located on the upper surface, which is located above the upper surface, which includes a second optical axis oriented upward from the upper surface, and which has a field of view in all directions around the second optical axis; and a first supporting member and a second supporting member, each supporting member protruding from the upper surface, wherein a first end portion of the first supporting member is located diagonally upward from a first part of the first supporting member that contacts the upper surface, the first end portion being located diagonally upward along a direction that the first supporting member protrudes, a first end portion of the second supporting member is located diagonally upward from a first part of the first supporting member that contacts the upper surface, the first end portion being located diagonally upward along a direction that the second supporting member protrudes, the first camera and the second camera are arranged over the first end portion of the first supporting member and the first end portion of the second supporting member, respectively, a first space is located between the first camera and the upper surface, a second space is located between the second camera and the upper surface, a distance measurement is performed based on parallax between a first image acquired by the first camera and a second image acquired by the second camera, the first image includes an image of the second space, and the second image includes an image of the first space.

15. A component comprising:
an upper surface;

a first camera which is arranged at a first portion that is located on the upper surface, which is located above the upper surface, which includes a first optical axis oriented upward from the upper surface, and which has a field of view in all directions around the first optical axis;

a second camera which is arranged at a second portion different from the first portion located on the upper surface, which is located above the upper surface, which includes a second optical axis oriented upward from the upper surface, and which has a field of view in all directions around the second optical axis; and a first supporting member and a second supporting member, each supporting member protruding from the upper surface, wherein the component is attached to a roof of a mobile object or to an upper edge portion of a door of the mobile object, a first end portion of the first supporting member is located diagonally upward from a first part of the first supporting member that contacts the upper surface, the first end portion being located diagonally upward along a direction that the first supporting member protrudes, a first end portion of the second supporting member is located diagonally upward from a first part of the first supporting member that contacts the upper surface, the first end portion being located diagonally upward along a direction that the second supporting member protrudes, the first camera and the second camera are arranged over the first end portion of the first supporting member and the first end portion of the second supporting member, respectively, a first space is located between the first camera and the upper surface, a second space is located between the second camera and the upper surface, a distance measurement is performed based on parallax between a first image acquired by the first camera and a second image acquired by the second camera, the first image includes an image of the second space, and the second image includes an image of the first space.

16. The component according to claim 15, wherein the mobile object is a vehicle, and the component is a rear spoiler, a roof rail, or a roof carrier.

* * * * *